United States Patent
Nakagawa et al.

(10) Patent No.: US 9,013,603 B2
(45) Date of Patent: Apr. 21, 2015

(54) IMAGE PROCESSING APPARATUS, IMAGE CAPTURE DEVICE, SERVER AND COMPUTER PROGRAM, WHERE IN CAPTURED MOVIE IMAGE IS WRITTEN IN THE STORAGE MEDIUM BASED ON THE SHOOTING CONDITION

(71) Applicant: Panasonic Corporation, Osaka (JP)

(72) Inventors: Hironobu Nakagawa, Osaka (JP); Tsutomu Mukai, Osaka (JP); Yoshinori Okazaki, Osaka (JP); Akira Seto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 148 days.

(21) Appl. No.: 13/798,889

(22) Filed: Mar. 13, 2013

(65) Prior Publication Data

US 2013/0258133 A1   Oct. 3, 2013

(30) Foreign Application Priority Data

Mar. 28, 2012   (JP) ................ 2012-073189

(51) Int. Cl.
*H04N 5/76* (2006.01)
*H04N 5/232* (2006.01)

(52) U.S. Cl.
CPC ............ *H04N 5/23229* (2013.01); *H04N 5/232* (2013.01)

(58) Field of Classification Search
None
See application file for complete search history.

(56) References Cited

U.S. PATENT DOCUMENTS

| | | | |
|---|---|---|---|
| 2006/0132623 A1* | 6/2006 | Nozaki et al. | 348/231.99 |
| 2008/0192129 A1* | 8/2008 | Walker et al. | 348/231.2 |
| 2009/0207263 A1* | 8/2009 | Mizuno et al. | 348/220.1 |
| 2010/0085444 A1* | 4/2010 | Konishi | 348/231.99 |
| 2010/0171846 A1* | 7/2010 | Wood et al. | 348/231.99 |
| 2012/0194702 A1* | 8/2012 | Naka | 348/231.99 |

FOREIGN PATENT DOCUMENTS

| | | |
|---|---|---|
| JP | 2009-088836 A | 4/2009 |
| JP | 2009-200559 A | 9/2009 |
| JP | 2010-153936 A | 7/2010 |

OTHER PUBLICATIONS

Co-pending U.S. Appl. No. 14/152,359, filed Jan. 10, 2014 (copy of application provided).
Co-pending U.S. Appl. No. 13/798,433, filed Mar. 13, 2013 (copy of application provided).
Co-pending U.S. Appl. No. 13/798,500, filed Mar. 13, 2013 (copy of application provided).

* cited by examiner

*Primary Examiner* — Sinh Tran
*Assistant Examiner* — Shahbaz Nazrul
(74) *Attorney, Agent, or Firm* — Renner, Otto, Boisselle & Sklar, LLP

(57) ABSTRACT

An image processor according to an embodiment of the present disclosure includes a movie generating section which generates movie data based on an image capturing signal that has been generated by an image capturing section, and a controller which determines, by reference to information concerning a shooting condition, whether or not to write the movie data (chapter(s) just before and/or right after a still picture is shot) on a memory in accordance with a shooting instruction.

6 Claims, 12 Drawing Sheets

FIG. 7

| CONTENT ID | CONTENT TYPE | REAL FILE NAME | CHAPTER INFORMATION | | | RELATION INFORMATION | |
|---|---|---|---|---|---|---|---|
| | | | START TIME | END TIME | TITLE | ASSOCIATED CONTENT ID | BEFORE /AFTER INFORMATION |
| D1-C1b | Video | DIG001.MP4 | 0:00:00 | 0:00:05 | | D1-P1 | BEFORE |
| D1-P1 | Picture | D1G001.JPG | — | — | | D1-C1b<br>D1-C1a | — |
| D1-C1a | Video | DIG001.MP4 | 0:00:05 | 0:00:10 | | D1-P1 | AFTER |

| CONTENT ID | DATE AND TIME OF SHOOTING | MODE | GPS | SHOOTING DIRECTION | CAP | SHOOTING INFORMATION | | | | | | | | | | | | | |
|---|---|---|---|---|---|---|---|---|---|---|---|---|---|---|---|---|---|---|---|
| | | | | | | CAMERA SHAKE | OUT OF FOCUS | PANNING /TILTING | BACK- LIGHT | LOW ILLUMI- NANCE | ORIEN- TATION | ASSIST LIGHT | SUBJECT | CHAP- TER LENGTH | HIGH- SPEED AF | PRELIMI- NARY FLASHING | DIAPHRAGM | ZOOMING RATE |
| D1-C1b | JAN-1-2012 10:00:00 | PORT- RAIT | LAT.: LONG.: | N. | OPEN | | | | | | | | | | | | | |
| D1-P1 | JAN-1-2012 10:00:00 | PORT- RAIT | LAT.: LONG.: | N. | OPEN | | | | | | | | | | | | | |
| D1-C1a | JAN-1-2012 10:00:05 | PORT- RAIT | LAT.: LONG.: | N. | OPEN | | | | | | | | | | | | | |

FIG.10

| SAVE DECISION CONDITION | NORMAL SHOOTING MODE | NIGHT VIEW SHOOTING MODE | SPORT SHOOTING MODE |
|---|---|---|---|
| A: CAP CLOSURE | ka | ka | ka |
| B: CAMERA SHAKE | kb | kb | kb |
| C: OUT OF FOCUS | kc | kc | kc |
| D: PANNING/TILTING RATE | kd | kd | kd' |
| E: BACKLIGHT | ke | ke | ke |
| F: LOW ILLUMINANCE | kf | kf' | kf |
| G: ORIENTATION | kg | kg | kg |
| H: USE OF AF ASSIST LIGHT | kh | kh' | kh |
| I: ANY SUBJECT THAT DOES NOT FIT SHOOTING MODE SELECTED? | ki | ki | ki |
| J: CHAPTER LENGTH | kj | kj | kj |
| K: USE OF HIGH SPEED AF | kk | kk | kk |
| L: USE OF PRELIMINARY FLASHING | kl | kl' | kl |
| M: HOW MUCH DIAPHRAGM HAS OPERATED | km | km | km |
| N: ZOOM LENS BARREL MOVING VELOCITY | kn | kn | kn' |
| O: SHOOTING TIME INTERVAL | ko | ko | ko |
| P: ANY PERSON NOT TO BE SHOT? | kp | kp | kp |
| Q: SHOOTING LOCATION (AND AZIMUTH) | kq | kq | kq |

FIG.14

| CONTENT ID | CONTENT TYPE | REAL FILE NAME | CHAPTER INFORMATION ||| RELATION INFORMATION ||
|---|---|---|---|---|---|---|---|
| | | | START TIME | END TIME | TITLE | ASSOCIATED CONTENT ID | BEFORE /AFTER INFORMATION |
| D1-C1b | Video | DIG001.MP4 | 0:00:00 | 0:00:05 | | D1-P1 | BEFORE |
| D1-P1 | Picture | D1G001.JPG | – | – | | D1-C1b<br>D1-C1a | – |
| D1-C1a | Video | DIG001.MP4 | 0:00:05 | 0:00:10 | | D1-P1 | AFTER |

SHOOTING INFORMATION

| CONTENT ID | DATE AND TIME OF SHOOTING | MODE | GPS | SHOOTING DIRECTION | CAP | CAMERA SHAKE | OUT OF FOCUS | PANNING /TILTING | BACK- LIGHT | LOW ILLUMI- NANCE | ORIEN- TATION | ASSIST LIGHT | SUBJECT | CHAP- TER LENGTH | HIGH- SPEED AF | PRELIMI-NARY FLASHING | DIA- PHRAGM | ZOOMING RATE |
|---|---|---|---|---|---|---|---|---|---|---|---|---|---|---|---|---|---|---|
| D1-C1b | JAN-1-2012 10:00:00 | PORT- RAIT | LAT.: LONG.: | N. | CLOSED | | | | | | | | | | | | | |
| D1-P1 | JAN-1-2012 10:00:00 | PORT- RAIT | LAT.: LONG.: | N. | CLOSED | | | | | | | | | | | | | |
| D1-C1a | JAN-1-2012 10:00:05 | PORT- RAIT | LAT.: LONG.: | N. | CLOSED | | | | | | | | | | | | | |

IMAGE PROCESSING APPARATUS, IMAGE CAPTURE DEVICE, SERVER AND COMPUTER PROGRAM, WHERE CAPTURED MOVIE IMAGE IS WRITTEN IN THE STORAGE MEDIUM BASED ON THE SHOOTING CONDITION

BACKGROUND

1. Technical Field

The present disclosure relates to an electronic device which processes a movie.

2. Description of the Related Art

An image capture device which can generate a digest movie as a digest of movie data is known.

For example, Japanese Laid-Open Patent Publication No. 2009-200559 discloses an image capture device which generates a single still picture and a movie stream as a digest movie when the shutter release key is pressed.

SUMMARY

The present disclosure provides a more favorable digest movie for the user.

An image processing apparatus according to an embodiment of the present disclosure includes: an image processor which generates movie data based on an image capturing signal that has been generated by an image capturing section; and a controller which determines, by reference to information concerning a shooting condition, whether or not to write the movie data on a storage medium in accordance with a shooting instruction.

According to the technique of the present disclosure, an favorable digest movie is provided for the user.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 7 schematically illustrates lists of information to be managed in a management database according to the first exemplary embodiment.

FIG. 10 is a table showing a list of save decision conditions according to the first exemplary embodiment.

FIG. 14 schematically illustrates the image data management information according to the third exemplary embodiment.

DETAILED DESCRIPTION

Figure 1:
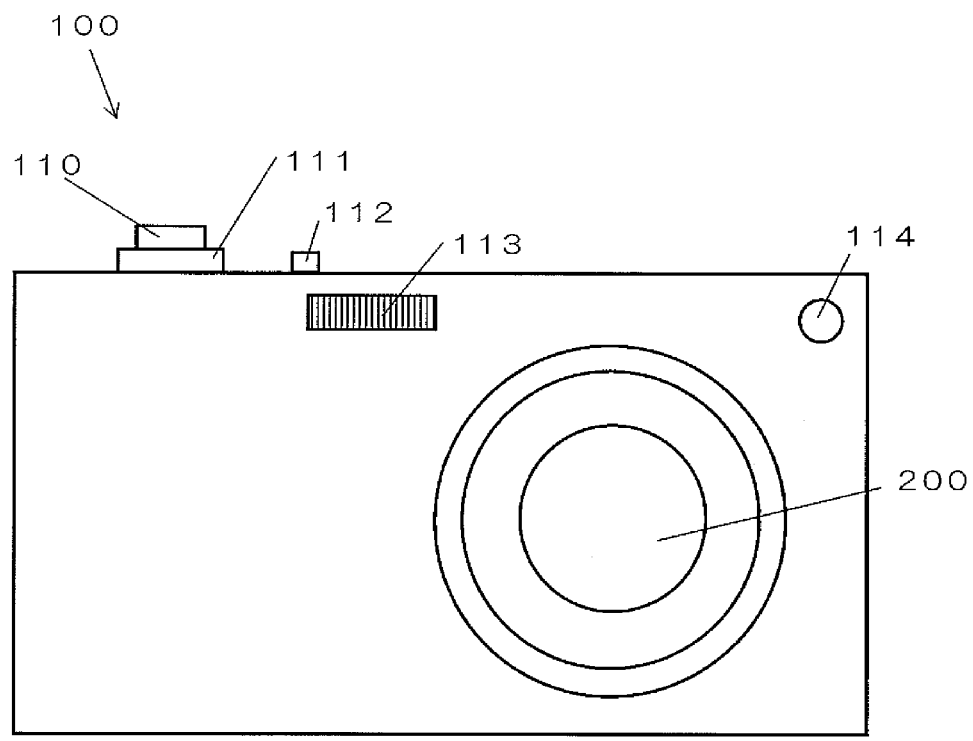
FIG. 1 is a front view illustrating a digital camera 100 as the first exemplary embodiment.

Hereinafter, embodiments will be described in detail with reference to the accompanying drawings as needed. It should be noted that the description thereof will be sometimes omitted unless it is absolutely necessary to go into details. For example, description of a matter that is already well known in the related art will be sometimes omitted, so will be a redundant description of substantially the same configuration. This is done solely for the purpose of avoiding redundancies and making the following description of embodiments as easily understandable for those skilled in the art as possible.

It should be noted that the present inventors provide the accompanying drawings and the following description to help those skilled in the art understand the present disclosure fully. And it is not intended that the subject matter defined by the appended claims is limited by those drawings or the description.

(Embodiment 1)

A digital camera 100 as the first embodiment of the present disclosure continuously writes movie data on a buffer memory 205 in a shooting mode. In response to an instruction to shoot a still picture that has been given by pressing a release button 110, the digital camera 100 transfers selected parts of the movie data that has been written on the buffer memory 205 to a memory card 221. Those selected parts may be movie data that has been captured just before (e.g., a few seconds before) the still picture is shot, or right after (e.g., a few seconds after) the still picture has been shot, or just before and after (e.g., a few seconds before and after) the still picture has been shot.

In the following description, a single unit of a movie to be captured just before and after (e.g., a few seconds before and after) a still picture has been shot will be referred to herein as a "chapter". Every time a chapter is added to the memory card 221, that chapter is combined with the previous chapter that has been written there last time, thus forming a single movie file. Such a movie file will be referred to herein as a "digest movie file". Every time a chapter is newly generated, the controller 210 of the digital camera 100 determines whether that chapter should be added to the old digest movie file or a new digest movie file. And such a movie data writing mode will be referred to herein as a "digest movie recording mode".

Hereinafter, the configuration and operation of the digital camera 100 of the first embodiment will be described with reference to the accompanying drawings.

1-1. Configuration

First of all, the configuration of the digital camera 100 of this embodiment will be described with reference to FIGS. 1 through 3.

[1-1-1. Configuration of Digital Camera 100]

FIG. 1 is a front view of the digital camera 100. As shown in FIG. 1, the digital camera 100 includes a lens barrel to house an optical system 200 in, a flash 113, and an AF (autofocus) assist lamp 114 on its front side. The digital camera 100 has an operating section, including a release button 110, a zoom lever 111 and a power button 112, on the top.

Figure 2:
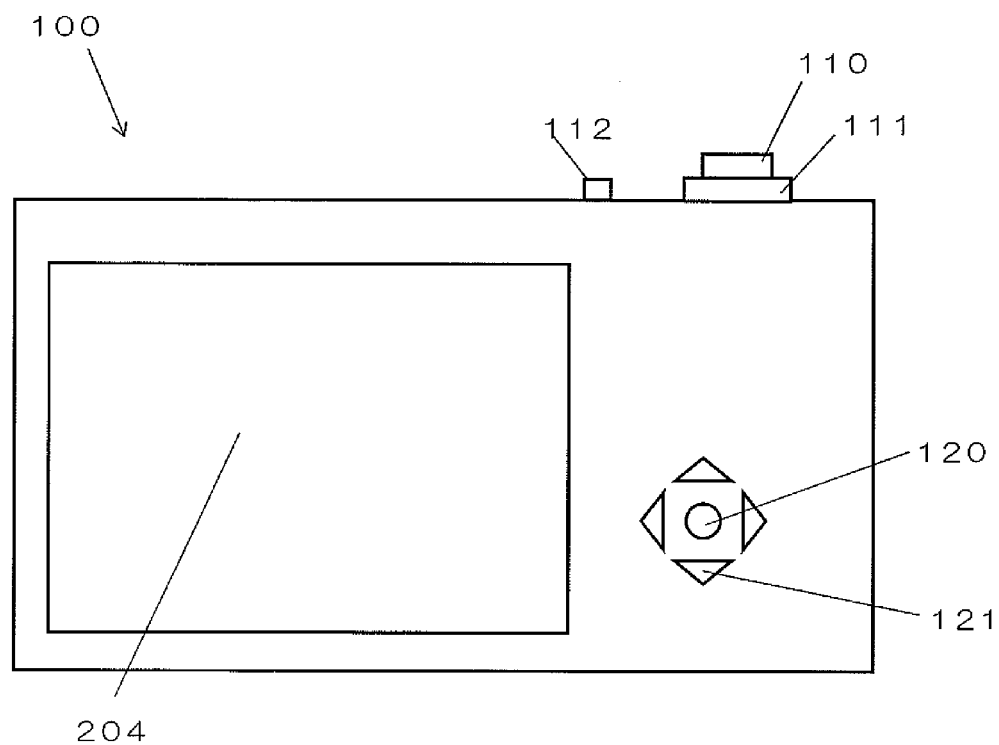
FIG. 2 is a rear view of the digital camera 100 of the first exemplary embodiment.

FIG. 2 is a rear view of the digital camera 100. As shown in FIG. 2, the digital camera 100 includes an LCD monitor 204 and operating buttons, including a menu button 120 and cross buttons 121, on its rear side.

Figure 3:
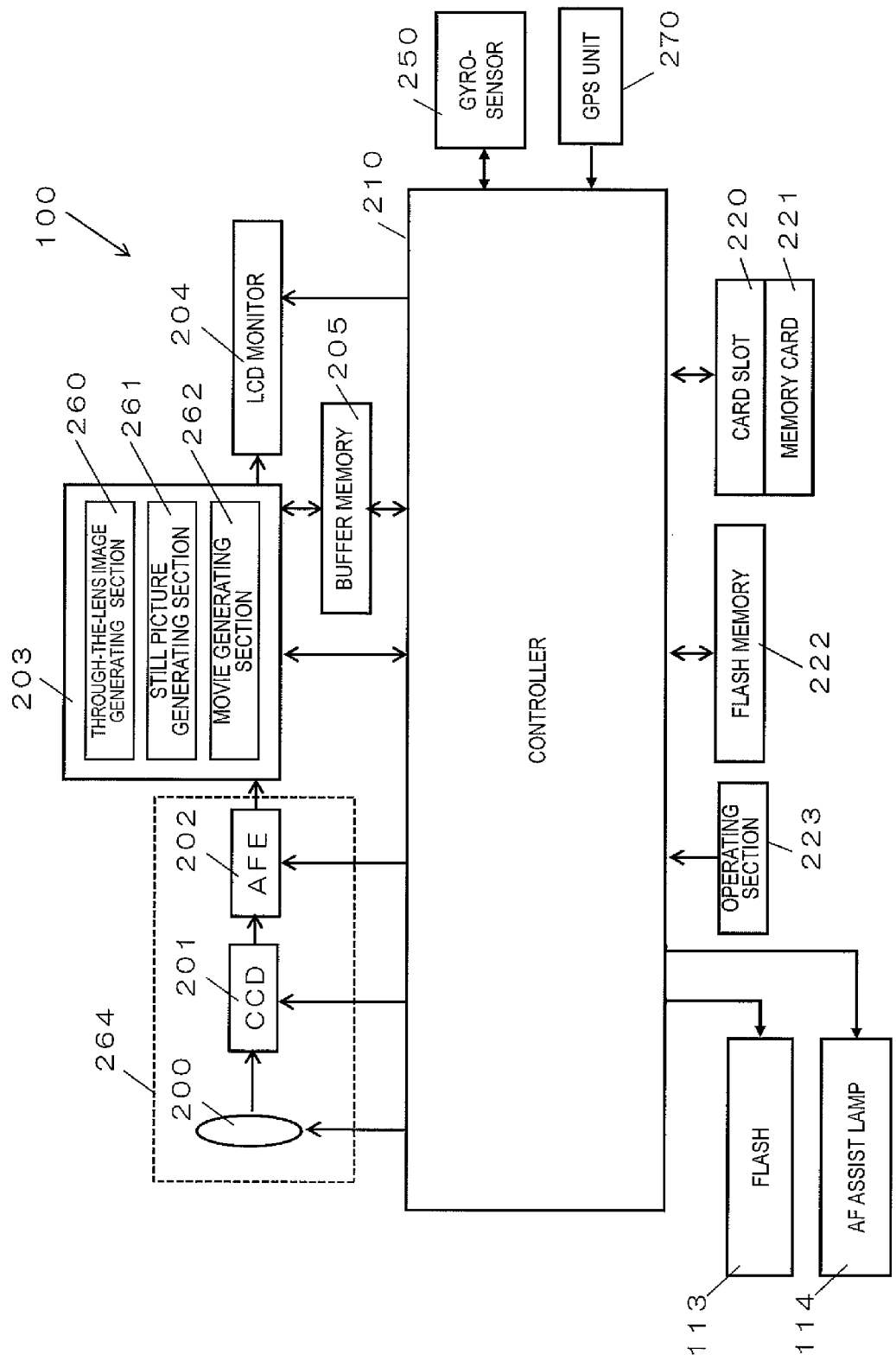
FIG. 3 illustrates a system configuration for the digital camera 100 of the first exemplary embodiment.

FIG. 3 is a block diagram illustrating a system configuration for the digital camera 100. As shown in FIG. 3, the digital camera 100 includes an optical system 200, a CCD image sensor 201, an AFE (analog front end) 202, an image processor 203, the LCD monitor 204, a buffer memory 205, a controller 210, the flash 113, the AF assist lamp 114, an operating section 223, a flash memory 222, a card slot 220, a memory card 221, a gyrosensor 250, and a GPS unit 270. The digital camera 100 makes the CCD image sensor 201 capture the subject image that has been produced through the optical system 200. Then, the CCD image sensor 201 generates image capturing data based on the subject image that has been captured. The AFE 202 processes the image capturing data thus generated. Based on the image capturing data thus processed by the AFE 202, the image processor 203 generates image data. The image data thus generated is then written on storage media including the flash memory 222 and the memory card 221. And the image data that has been written on the flash memory 222 and the memory card 221 is displayed on the LCD monitor 204 in accordance with the instruction given by the user who is operating this digital camera 100 using the operating section 223.

Hereinafter, the respective components of the digital camera 100 shown in FIGS. 1 to 3 will be described in detail one by one.

The optical system 200 includes a focus lens, a zoom lens, a diaphragm and a shutter. Optionally, the optical system 200 may further include an OIS (optical image stabilizer) lens as well. It should be noted that this optical system 200 may include any other number of lenses and may be made up of any number of groups of lenses. The number of lenses or the number of groups of lenses is appropriately determined according to the function required. The focus lens, the zoom lens, the diaphragm, the shutter and the OIS lens are driven by their associated drivers (such as a DC motor or a stepping motor) in accordance with a control signal supplied from the controller 210.

The CCD image sensor 201 captures the subject image that has been produced through the optical system 200, thereby generating image capturing data. The CCD image sensor 201 generates image data for a new frame at regular time intervals. Also, the CCD image sensor 201 adjusts the degree of exposure using an electronic shutter. Optionally, any other type of image sensor such as a CMOS image sensor or an NMOS image sensor may be used instead of the CCD image sensor 201.

The AFE 202 subjects the image capturing data, which has been generated by the CCD image sensor 201, to correlated double sampling, gain control, and other kinds of processing. Also, the AFE 202 converts the analog image capturing data into digital image capturing data and outputs the image capturing data thus converted to the image processor 203.

In this embodiment, multiple components including the optical system 200, the CCD image sensor 201, and the AFE 202 form an image capturing section 264. The image capturing data is generated and output by the image capturing section 264.

The image processor 203 receives the image capturing data from the AFE 202 and subjects the image capturing data to various kinds of processing, thereby generating image data. Examples of those various kinds of processing include gamma correction, white balance correction, YC conversion, electronic (or digital) zooming, compression and expansion. However, these are just examples. Based on the image capturing data provided by the AFE 202, the image processor 203 can extract the feature point of a particular subject from an image area specified by the image capturing data and can make a decision on the subject. For example, if the feature point of some person's face is added to a list in advance, then the image processor 203 can recognize that person's face. In addition, based on the image capturing data provided by the AFE 202, the image processor 203 can determine whether the image has been shot against the sun, whether the illuminance is a predetermined value or less (i.e., whether the illuminance is low), and whether there is any subject that does not fit the shooting mode of the digital camera 100 that has been set, and can also make other decisions.

The image processor 203 may be implemented as a digital signal processor (DSP) or a microcomputer, for example.

The image processor 203 includes a through-the-lens image generating section 260, a still picture generating section 261, a movie generating section 262 and other image generating sections.

The through-the-lens image generating section 260 generates image data to be displayed on the LCD monitor 204 based on the image capturing data provided sequentially by the AFE 202 (at a rate of 60 frames per second, for example). Looking at the video displayed on the LCD monitor 204, the user can determine easily the angle of view of shooting and other parameters.

Based on the image capturing data that has been obtained by pressing down the release button 110, the still picture generating section 261 generates a still picture to be recorded. The still picture generating section 261 generates a still picture file compliant with the JPEG standard, for example. In generating a still picture file, the still picture generating section 261 adds management information about the still picture to that file. Examples of the management information includes information indicating whether the cap is closed, information about the camera shake, information about the focusing state, information about the rate of panning or tilt, information about backlight, information about the illuminance, information about the orientation of the camera, information about the AF assist light, information indicating whether there is any subject that does not fit the shooting mode selected, information about high speed AF, and information about preliminary flashing. The still picture file that has been generated by the still picture generating section 261 is written by the controller 210 on the memory card 221. In writing the still picture file on the memory card 221, the controller 210 adds management information about the still picture file to a management database.

Based on the image capturing data obtained when a movie recording button (not shown) is pressed down, the movie generating section 262 generates a movie file to be written. The movie generating section 262 generates a movie file compliant with the AVDHC standard or the MP4 standard, for example. In addition, based on the image capturing data obtained just before and right after the release button 110 is pressed down, the movie generating section 262 also generates movie files (chapters) just before and right after the timing of shutter release. The movie files or chapters thus generated are written by the controller 210 on the memory card 221. In saving the chapters on the digest movie file in the memory card 221, the controller 210 adds management information about the chapters to the management database. Examples of the management information about the chapter further include, in addition to the management information about the still picture, information about the lengths of the chapters generated, information about how much the diaphragm has operated while the chapters are being generated, and information about the rate of movement of the zoom lens while the chapters are being generated.

In the digest movie recording mode, the still picture generating section 261 generates a still picture file based on the image capturing data obtained when the release button 110 is pressed down. The controller 210 writes the still picture file thus generated on the memory card 221. In the meantime, based on the image capturing data obtained just before and right after the release button 110 is pressed down, the movie generating section 262 generates movie files (chapters) just before and right after the timing of shutter release. The controller 210 adds the chapters thus generated to the digest movie file and writes them on the memory card 221. Also, the controller 210 associates the still picture file, the chapter, and the digest movie file to which the chapter has been added with each other if those files and chapter have been generated at the same time, and writes them on the memory card 221. Specifically, by reference to the management database, the controller 210 associates those files and chapter if they have been generated at the same time. The management database will be described in detail later.

The LCD monitor 204 displays an image based on the image data that has been processed by the image processor 203. The LCD monitor 204 may display not only an image but also various kinds of settings of this digital camera 100.

The controller 210 controls the overall operation of this digital camera 100, and includes a ROM to store a program and other sorts of information and a CPU to process the program and other information. The ROM stores programs about an autofocus (AF) control and an autoexposure (AE) control and a program to control the overall operation of this digital camera 100.

The controller 210 determines whether or not the optical system 200 of this digital camera 100 is covered with a cap in order to cut the light that would enter the optical system 200. This decision can be made either by some mechanical method or an electrical method.

The controller 210 performs an AF control. First of all, the controller 210 gets a contrast value in a particular subject area of the image data from the image processor 203. By getting such contrast values continuously, the controller 210 senses the focusing state in a particular subject area and drives the focus lens so as to focus on that subject area. In carrying out high-speed autofocusing, the controller 210 controls the CCD image sensor 201 so that the CCD image sensor 201 outputs image capturing data at an increased frame rate and that the resolution is decreased. This control is performed because a larger number of contrast values can be obtained per unit time and the in-focus position can be found more quickly by increasing the frame rate and because by decreasing the resolution, the contrast detection processing rate can be increased. As for whether autofocusing should be carried out at normal speeds or at high speeds, the user may make his or her choice in advance or the controller 210 may make a decision automatically according to the shooting situation. The time for the controller 210 to carry out the AF control may be the time when the user presses the release button 110 halfway through.

Alternatively, the AF control may also be carried out continuously while the subject is being shot. Information about the focusing state while a still picture is being shot is managed with the management database to be described later.

The controller 210 also performs an autoexposure (AE) control. First of all, the controller 210 gets luminance information in a particular subject area of the image data from the image processor 203. In order to get an appropriate exposure of the subject, the controller 210 calculates exposure values based on pieces of luminance information that have been obtained continuously. Based on the exposure values calculated and a predetermined program diagram, the controller 210 determines an F value and a shutter speed. The program diagram defines a relation between the exposure value, the F value, and the shutter speed. By monitoring the luminance information to be obtained from the image data, the controller 210 performs the AE control continuously. The exposure value for shooting may be fixed either when the release button 110 is pressed halfway by the user or when the release button 110 is pressed fully by him or her. The F value, shutter speed, sensitivity and other kinds of information to be relied on when a still picture is going to be shot is managed using the management database to be described later.

The controller 210 may be implemented as either only a set of hardware circuits or a combination of hardware and software. The controller 210 may be implemented as a microcomputer, for example. Alternatively, the controller 210 and the image processor 203 may form a single semiconductor chip. Also, the ROM does not have to be one of the internal components of the controller 210 but may also be provided outside of the controller 210 as well.

The buffer memory 205 is storage means that functions as a work memory for the image processor 203 and the controller 210 and may be implemented as a DRAM (dynamic random access memory), for example.

Meanwhile, the flash memory 222 functions as an internal memory to store the image data and other kinds of information.

The card slot 220 is connection means, to/from which the memory card 221 is readily insertable and removable, and can be connected to the memory card 221 both electrically and mechanically. Optionally, the card slot 220 may be configured to control the memory card 221.

The memory card 221 is an external memory with an internal storage medium such as a flash memory, and can store data such as the image data to be processed by the image processor 203. In this example of this embodiment, the memory card 221 is supposed to be used as an exemplary external memory. However, this is only an example. Alternatively, the external memory may also be a storage medium such as an optical disc.

The operating section 223 is a generic term that refers collectively to a number of operating buttons and dials that are arranged on the outer shell of this digital camera 100, and accepts the user's instructions. Specifically, the operating section 223 includes the release button 110, the zoom lever 111, the power button 112, the menu button 120 and the cross buttons 121 shown in FIGS. 1 and 2. On accepting the user's instruction, the operating section 223 sends various operation instruction signals to the controller 210.

The release button 110 is a two-stage press button that can be pressed down halfway and fully by the user. Specifically, when the release button 110 is pressed halfway by the user, the controller 210 performs the autofocus (AF) control and the autoexposure (AE) control described above, thereby determining the shooting condition. And when the release button 110 is pressed down fully by the user, the controller 210 writes the image data, (which may be a still picture or a chapter and) which has been captured and generated when the button is pressed down fully, on the memory card 221.

The menu button 120 is another press button. When the menu button 120 is pressed by the user, the controller 210 gets a menu displayed on the LCD monitor 204. The menu is displayed on the screen to allow the user to determine the settings of the shooting and playback conditions. The menu button 120 may also function as an ENTER button so that if the menu button 120 is pressed while the user is choosing one of the options of any of various condition setting items, that option is selected.

The cross buttons 121 are yet another set of press buttons, which are arranged over, under, and on the right and left of the menu button 120. By pressing any of these cross buttons 121, the user can choose one of the options of any of the various condition setting items that are being displayed on the LCD monitor 204.

The flash 113 includes a xenon tube, a, capacitor, a booster circuit, and a firing trigger circuit. In accordance with a control signal supplied from the controller 210, the booster applies a high voltage to the capacitor. Also in accordance with a control signal supplied from the controller 210, the firing trigger circuit discharges the high voltage that has been applied to, and stored in, the capacitor, thereby instantaneously emitting flash light from the xenon gas in the xenon tube synchronously with acceptance of the instruction to shoot a still picture. By firing the flash 113 instantaneously with respect to the subject, the subject can be shot with the lack of brightness compensated for. As a result, this digital camera 100 can shoot a bright still picture of a subject even under a dark shooting environment. Information indicating whether the flash has been fired or not while a still picture is being shot is managed by the management database to be described later.

The AF assist lamp 114 emits an AF assist light in order to compensate for the lack of illuminance of the subject and get the subject's contrast value while the controller 210 is performing the AF control described above. Particularly when the subject has low illuminance, it is difficult to get an AF controllable contrast value from the subject. With the AF assist light, however, the controller 210 can get an AF controllable contrast value in an increased number of scenes. Information indicating whether the AF assist light has been emitted or not during the AF control is managed by the management database to be described later.

Based on the variation in the angle of the digital camera 100 per unit time (i.e., based on the angular velocity of the digital camera 100), the gyrosensor 250 detects its shake (or vibration) in the yawing direction and in the pitching direction. And the gyrosensor 250 outputs an angular velocity signal representing the magnitude of the camera shake (i.e., the angular velocity) detected to the controller 210. Optionally, as long as the shake of the digital camera 100 can be detected, any other kind of sensor may be used instead of the gyrosensor 250. The controller 210 calculates the magnitude of the camera shake of the digital camera 100 based on the output of the gyrosensor 250 and drives the optical image stabilizer lens so as to minimize the influence of the camera shake. The controller 210 also determines, based on the output of the gyrosensor 250, whether the digital camera 100 is being panned (or tilted) by the shooter, and calculates the rate of panning (or tilting). Furthermore, the controller 210 can also detect the orientation of the digital camera 100 based on the output of the gyrosensor 250.

The GPS unit 270 detects the current location of the digital camera 100 using the global positioning system by satellite. The controller 210 gets information about the current location (including the latitude and the longitude) via the GPS unit 270. The digital camera 100 can associate the current location information provided by the GPS unit 270 with the image shot (which may be either a still picture or a movie such as a chapter). Information about the current location while a still picture is being shot is managed by the management database to be described later.

1-2. Digest Movie Recording Operation

Hereinafter, it will be described with reference to FIGS. 4 through 10 exactly how this digital camera 100 operates.

Figure 4:
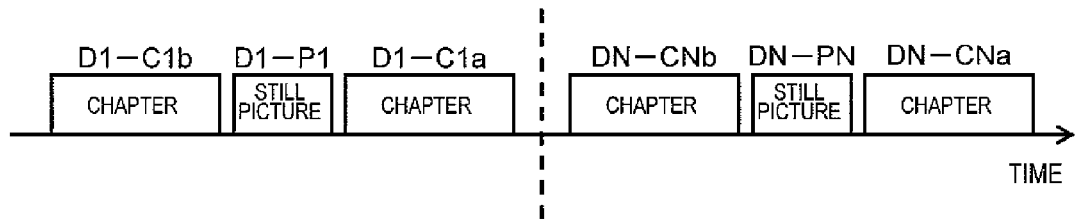
FIG. 4 generally illustrates how to record a digest movie according to the first exemplary embodiment.

First of all, it will be outlined with reference to FIG. 4 how to perform a digest movie recording operation.

FIG. 4 illustrates conceptually a series of still pictures and chapters, which have been recorded in accordance with an instruction to shoot a still picture and which are arranged time sequentially on the time axis. As shown in FIG. 4, there are two chapters just before and right after each still picture. In this example, an $N^{th}$ digest movie will be identified herein by DN, the chapters just before and right after the $N^{th}$ still picture has been shot will be identified herein by DN-CNb and DN-CNa, respectively, and the $N^{th}$ still picture will be identified herein by DN-PN.

For example, the first digest movie is identified herein by D1. In that case, the chapters just before and right after the first still picture has been shot are identified herein by D1-C1b and D1-C1a, respectively, and the still picture shot at this time is identified herein by D1-P1.

As can be seen, every time an instruction to shoot a still picture is given, this digital camera 100 writes a still picture and chapters on the memory card 221 one after another.

[1-2-1. Configuration of Digest Movie Menu]

Figure 5:
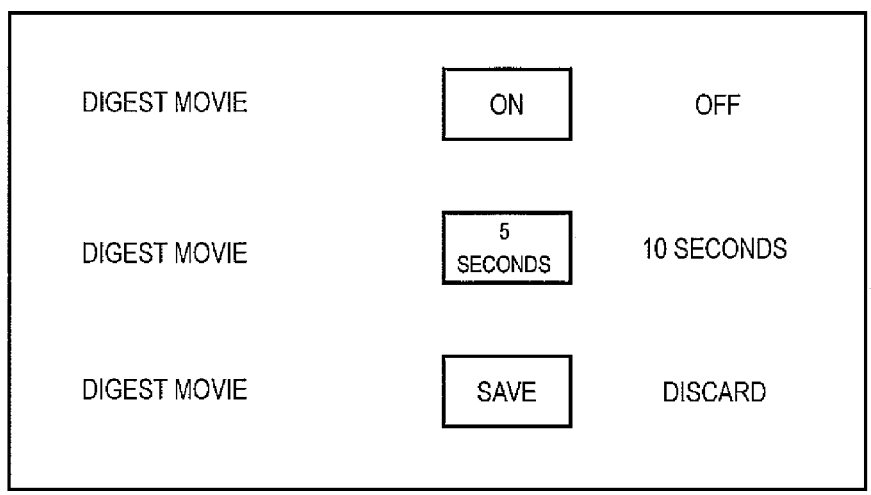
FIG. 5 illustrates generally how the digest movie menu looks according to the first exemplary embodiment.

FIG. 5 illustrates generally how the digest movie menu looks. In the digital camera 100 of this embodiment, when the user operates the operating section 223, a digest movie menu such as the one shown in FIG. 5 is displayed on the LCD monitor 204.

As shown in FIG. 5, the digest movie menu includes three items that allow the user to decide whether or not he or she'd like to record the digest movie (ON/OFF), how long the chapters to generate should be (5 seconds or 10 seconds), and whether or not the movie right after an instruction to record a still picture has been accepted should be generated as a chapter (save or discard). By operating the operating section 223, the user can choose any of these options of each item.

Optionally, the digest movie menu may further include another item that allows the user to decide whether or not the movie just before an instruction to record a still picture has been accepted should be generated as a chapter (save or discard). In that case, if he or she chooses the "discard" option, only the movie right after the instruction to record a still picture has been accepted will be generated as a chapter.

In the example to be described below, the user's preference as to whether or not to record the digest movie is supposed to be "ON", his or her preference as to how long the chapters to generate should be is supposed to be "5 seconds", and his or her preference as to whether or not the movie right after the instruction to record a still picture has been accepted should be generated as a chapter is supposed to be "save". Also, the instruction to shoot a still picture triggers an instruction to generate a chapter.

[1-2-2. Format of Digest Movie Management Information]

Figure 6:
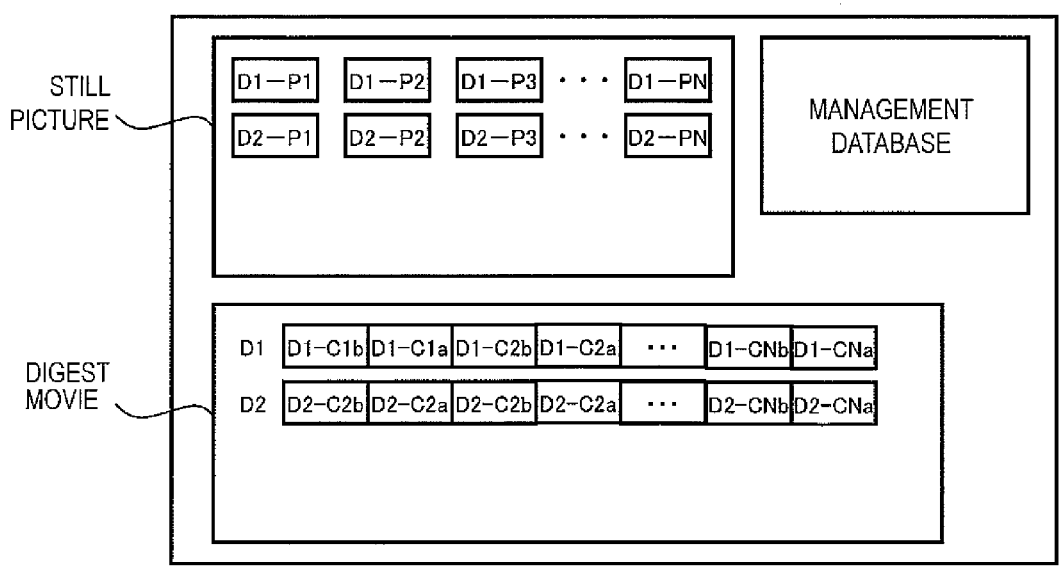
FIG. 6 illustrates the format of data stored in a memory card according to the first exemplary embodiment.

Next, the format of data to be written on the memory card 221 in the digest movie recording mode will be described with reference to FIG. 6.

The controller 210 determines whether or not to write a digest movie and/or a still picture on the memory card 221. FIG. 6 shows the data format of the memory card 221 in a situation where a digest movie and/or a still picture has/have been written on the memory card 221. It will be described in detail later exactly how the controller 210 makes the decision.

In this example, a still picture, a digest movie and a management database have been written on the memory card 221. In the management database, the shooting information of the still picture and the chapters (i.e., information about the shooting condition) is managed. By reference to the management database, the controller 210 can check out the shooting information of the still picture and chapters that are stored on the memory card 221. Also managed in the management database is information about the correlation between the still picture and the chapters that have been generated just before and right after the still picture. By reference to the management database, the controller 210 can see what still picture has been written on the memory card 221 and what chapters have been written in association with the still picture.

Next, the management information (including shooting information and its associated information) to be managed by the management database will be described with reference to FIG. 7, which schematically illustrates lists of information to be managed in the management database.

As shown in FIG. 7, the management database includes content IDs, content types, digest movie IDs, real file names, chapter information (including the title, start time and end time of the chapter), relation information (including the ID of associated content and information about chapters before and after the still picture), and shooting information (including the date and time of shooting, scene mode information, geographic location information, shooting direction, cap closure information, camera shake information, focusing state information, panning/tilting rate information, information indicating whether shooting is done against the sun, illuminance information, camera orientation information, information indicating whether an AF assist light has been used, information indicating whether there is any subject that does not fit the shooting mode selected, chapter length information, information indicating whether high speed AF has been used, information indicating whether the flash has fired preliminarily, information about how much the diaphragm has been driven while generating the chapters, information about the moving velocity of the zoom lens while generating the chapters, shooting time interval information, and information indicating whether the subject includes any person not to be shot). Even though these various kinds of information are supposed to be managed by the management database, these pieces of information may also be managed in the header section of each content data (including Exif and user data area).

The content ID is a unique identifier to be given to each content (which may be a still picture or a movie file (chapter)). The content type indicates whether each content is a still picture or a movie. The digest movie ID is the ID of the digest movie in which each chapter is saved. The real file name is the name of the file that includes each content. The chapter information includes the title of each chapter and the start time and end time of the digest movie. The relation information is information about the correlation between a still picture and chapters that have been generated with the still picture. The relation information includes the associated ID (which is the content ID of the associated movie file (chapter) in the case of a still picture or the content ID of the associated still picture in the case of a movie file (chapter)) and information about the chapters before and after the still picture. That is to say, that is a piece of information indicating whether the chapter is just before or right after the timing of shutter release. Optionally, the shooting information may further include other pieces of information about the standard of the movie.

[1-2-3. Digest Movie Recording Operation]

Figure 8:
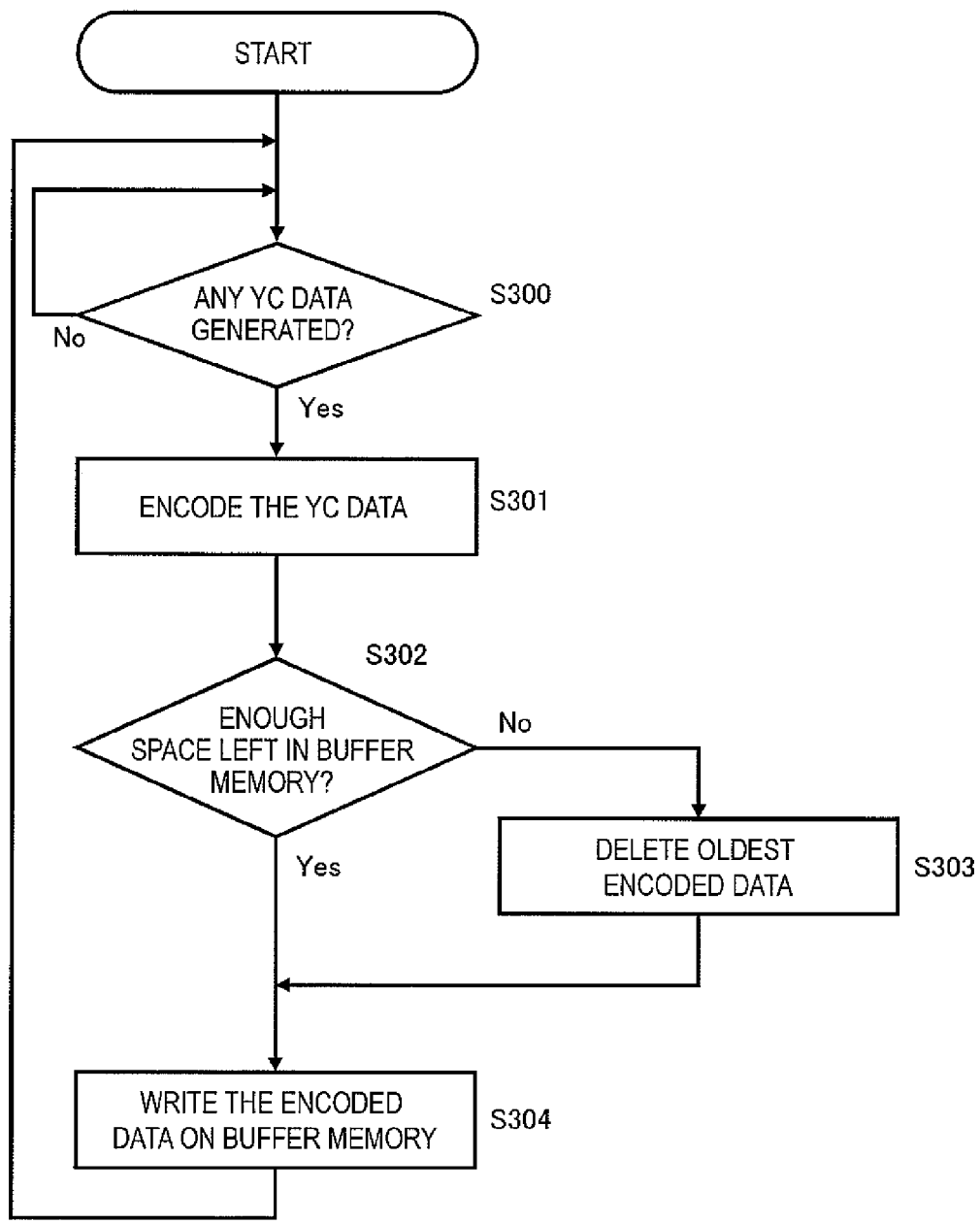
FIG. 8 is a flowchart showing the procedure of movie buffering according to the first exemplary embodiment.

Hereinafter, it will be described with reference to FIG. 8 how to record a digest movie.

First of all, it will be described how this digital camera 100 performs movie buffering. FIG. 8 is a flowchart showing the procedure of that movie buffering. In generating a chapter, the movie generating section 262 in the image processor 203 performs movie buffering following the flow shown in FIG. 8.

If a shooting mode has already been selected, the CCD image sensor 201 gets the subject image that has been produced through the optical system 200 and sequentially generates image capturing data. As described above, the image capturing data that has been generated by the CCD image sensor 201 is subjected to the processing at the AFE 202 and then input to the image processor 203, which subjects the given image capturing data to YC conversion processing, thereby generating IC data. In general, the image capturing data generated by the CCD image sensor 201 is RGB data. In this description, the YC conversion processing refers herein to converting the RGB data into data representing a luminance component Y and data representing a color difference component C.

The controller 210 monitors if the image processor 203 has generated YC data yet (in Step S300). If no YC data has been generated yet (i.e., if the answer to the query of the processing step S300 is NO), the controller 210 waits until YC data is generated. On the other hand, if YC data has already been generated, then the controller 210 instructs the image processor 203 to encode the YC data generated by a predetermined encoding method. In accordance with the instruction given by the controller 210, the image processor 203 encodes the YC data generated by the predetermined encoding method, thereby generating encoded data (in Step S301). In this embodiment, the image processor 203 generates encoded data of a movie file (chapter).

Next, using the buffer memory 205 as a ring buffer, the controller 210 writes the encoded data on the buffer memory 205. The controller 210 determines whether or not there is at least a predetermined space left in the buffer memory 205 (in Step S302). If the space left in the buffer memory 205 is less than the predetermined value (i.e., if the answer to the query of the processing step S302 is NO), then the controller 210 deletes the oldest encoded data that has been stored in the buffer memory 205 on a GOP (group of pictures) basis (in Step S303). And the controller 210 writes the encoded data that has been generated in Step S301 on the buffer memory 205 in which there is plenty of space left now as a result of the processing step S303. On the other hand, if the space left in the buffer memory 205 is equal to or greater than the predetermined value (i.e., if the answer to the query of the processing step S302 is YES), then the controller 210 writes the encoded data that has been generated in Step S301 as it is on the buffer memory 205. After that, the controller 210 performs the same series of processing steps S300 through S304 all over again.

Figure 9:
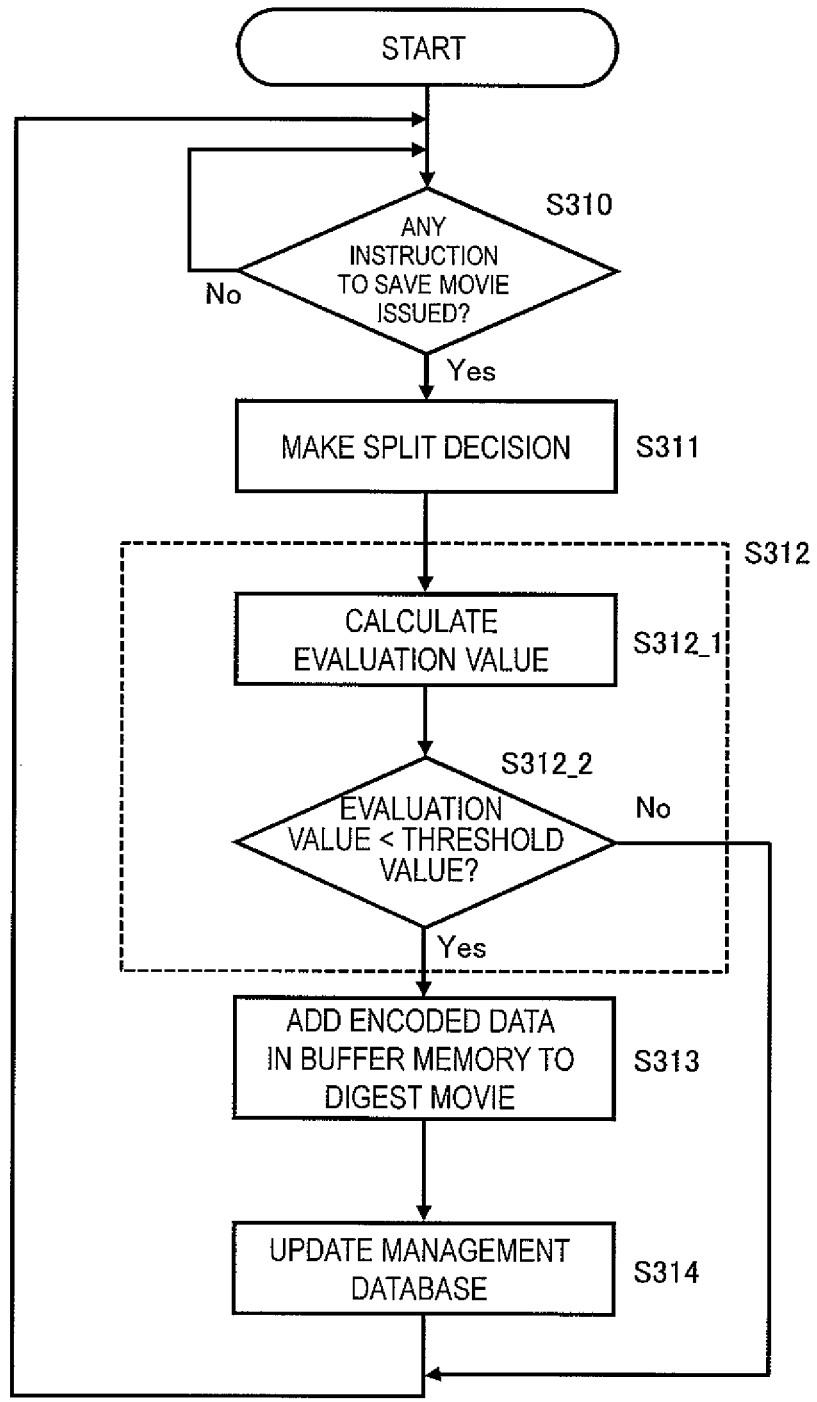
FIG. 9 is a flowchart showing the procedure in which one chapter of a digest movie is generated according to the first exemplary embodiment.

Next, it will be described with reference to FIG. 9 how to generate a movie (chapter) in accordance with an instruction to shoot a still picture. FIG. 9 is a flowchart showing the procedure in which one chapter of a digest movie is generated.

First, the controller 210 monitors if any instruction to generate a movie (chapter) in accordance with an instruction to shoot a still picture has been issued (in Step S310). If any instruction to generate a movie file (chapter) has been issued, the controller 210 decides whether the chapter to generate newly should be added to an existent digest movie file or a new digest movie file should be generated and the chapter should be saved there (in Step S311). Such a processing step will be referred to herein as a "split decision". For example, the controller 210 makes such a split decision according to the date and time of generation of the chapter.

Next, the controller 210 performs save decision processing (in Step S312), which includes the processing step of calculating an evaluation value (S312_1) and the processing step of comparing the evaluation value to a predetermined threshold value (S3122). These processing steps S312_1 and S312_2 will be described briefly below.

Specifically, the controller 210 calculates an evaluation value based on the shooting information (in Step S312_1). Next, the controller 210 compares the evaluation value calculated to a predetermined threshold value, thereby determining whether or not the encode data stored in the buffer memory 205 should be saved as a chapter in the memory card 221 (in Step S312_2). The predetermined threshold value may have been stored in advance in the flash memory 222. Alternatively, information representing the predetermined threshold value may have been stored in an internal memory (not shown) in the controller 210.

This save decision processing S312 will be described in further detail later.

Next, if the evaluation value turns out to be less than the predetermined threshold value (i.e., if the answer to the query of the processing step S312_2 is YES), the controller 210 reads the encoded data stored in the buffer memory 205 and adds the encoded data to the digest movie file that is stored in the memory card 221 (in Step S313). In this processing step, if the decision has been made in Step S311 that the chapter should be added to the existent digest movie file, then the controller 210 adds the chapter to the existent digest movie file in the memory card 221.

On the other hand, if the decision has been made in Step S311 that the chapter should be saved on a new digest movie file, then the controller 210 generates a new digest movie file in the memory card 221 and saves the chapter there.

Next, the controller 210 adds information about the newly generated chapter to the management database and updates the management database (in Step S314). The management information to be added to the management database includes content ID, content type, digest movie ID, real file name, chapter information, relation information, shooting information and so on as shown in FIG. 7.

On the other hand, if the evaluation value is equal to or greater than the predetermined threshold value (i.e., if the answer to the query of the processing step S3122 is NO), then the controller 210 does not add the encoded data stored in the buffer memory 205 to the digest movie file or update the management database.

In the processing step S312_2 of comparing the evaluation value to the predetermined threshold value, the decision does not always have to be made whether the evaluation value is less than the predetermined threshold value. Alternatively, the decision may also be made whether the evaluation value is greater than the predetermined threshold value.

[1-2-4. Digest Movie Save Decision During Recording]

Hereinafter, the save decision processing 5312 will be described in detail. Based on the magnitude of the camera shake, panning/tilting, or the illuminance during shooting or depending on whether flashlight, AF assist light or high-speed AF mode is used or not during shooting, the digital camera 100 of this embodiment can automatically determine whether or not the chapter generated is worth saving.

The save decision conditions on which the controller 210 determines whether or not to write a newly generated chapter on the memory card 221 will be described with reference to FIG. 10.

As shown in FIG. 10, the digital camera 100 of this embodiment defines save decision conditions A through Q. The evaluation values a through q calculated based on these save decision conditions A through Q are normalized so as to have a value falling within the range of 0 through 100, for example. As a result, the controller 210 can make an overall decision on whether or not to save the chapter generated. The smaller any of these evaluation values a through q, the better the result of evaluation is supposed to be. The larger the evaluation value, the worse the result of evaluation is supposed to be. Alternatively, these evaluation values a through q may also be defined so that the smaller any of these evaluation values a through q, the worse the result of evaluation is and that the larger the evaluation value, the better the result of evaluation is.

The save decision condition A indicates whether the lens cap of the digital camera 100 is open or closed. By reference to the information indicating whether the lens cap of the digital camera 100 is open or closed, the controller 210 calculates an evaluation value concerning the save decision condition A. Specifically, if the lens cap is closed, the chapter generated will be solid black video and will be a candidate chapter that is not worth saving. The evaluation value of a chapter based on the save decision condition A will be identified herein by "a". In general, the lens cap is either closed or open. Thus, the evaluation value a calculated is normalized to be 0 if the lens cap is open and to be 100 if the lens cap is closed.

The save decision condition B indicates the magnitude of camera shake. Based on the magnitude of camera shake, the controller 210 calculates an evaluation value concerning the save decision condition B. A chapter to be generated with significant camera shake will be an unpleasant movie, of which the contents are not easy to understand, and will be a candidate chapter that is not worth saving. The evaluation value of a chapter based on the save decision condition B will be identified herein by "b". The evaluation value b calculated is normalized to be 0 if the magnitude of camera shake can be regarded as zero and to have a value that increases as the magnitude of camera shake increases.

The save decision condition C indicates the degree of out of focus (or blur). Based on the degree of out of focus, the controller 210 calculates an evaluation value concerning the save decision condition C. By evaluating the contrast value of the image shot, the controller 210 can evaluate the degree of out of focus. A chapter to be generated with a significant degree of out of focus will be an unpleasant movie, of which the contents are not easy to understand, and will be a candidate chapter that is not worth saving. The evaluation value of a chapter based on the save decision condition C will be identified herein by "c". The evaluation value c calculated is normalized to be 0 if the degree of blur is smaller than a predetermined reference value and to have a value that increases as the degree of blur increases.

The save decision condition D indicates the rate of panning/tilting. Based on the rate of panning/tilting, the controller 210 calculates an evaluation value concerning the save decision condition D. A chapter to be generated with a high rate of panning/tilting will be an unpleasant movie, of which the contents are not easy to understand, and will be a candidate chapter that is not worth saving. The evaluation value of a chapter based on the save decision condition D will be identified herein by "d". The evaluation value d calculated is normalized to be 0 if the rate of panning/tilting is smaller than a predetermined reference value and to have a value that increases as the rate of panning/tilting rises.

The save decision condition E indicates the degree of backlighting. Based on the degree of backlighting, the controller 210 calculates an evaluation value concerning the save decision condition E. A chapter to be generated by shooting against the sun (or under backlight) will be a movie, in which the subject that has been shot (such as a person) has so low illuminance that the contents are not easy to understand, and will be a candidate chapter that is not worth saving. The evaluation value of a chapter based on the save decision condition E will be identified herein by "e". The evaluation value e calculated is normalized to be 0 if the degree of backlighting is smaller than a predetermined reference value and to have a value that increases as the degree of backlighting increases.

The save decision condition F indicates the degree of the lowness of illuminance. Based on the degree of the lowness of illuminance, the controller 210 calculates an evaluation value concerning the save decision condition F. A chapter to be generated with low illuminance will be either quite dark video or noisy video due to an increase in gain by the AFE 202. Also, if the illuminance is low, the frame rate is sometimes decreased in order to extend the exposure time. And if the frame rate is decreased, then the chapter generated can be an unsmooth movie. That is why a chapter that has been generated with low illuminance will be a candidate chapter that is not worth saving. The evaluation value of a chapter based on the save decision condition F will be identified herein by "f". The evaluation value f calculated is normalized to be 0 if the illuminance is larger than a predetermined reference value and to have a value that increases as the illuminance decreases.

The save decision condition G indicates the orientation of the digital camera 100. By reference to information indicating the orientation of the digital camera 100, the controller 210 calculates an evaluation value concerning the save decision condition G. A chapter that has been generated with the digital camera 100 facing downward may be video that has shot the ground. Or the chapter that has been generated with the digital camera 100 facing downward is highly likely to be an unintentional scene for the shooter, to say the least. That is why a chapter that has been generated will be a candidate chapter that is not worth saving. The evaluation value of a chapter based on the save decision condition G will be identified herein by "g". The evaluation value g calculated is normalized to be 100 if the digital camera 100 has turned out to be facing downward and to be zero otherwise.

The save decision condition H indicates whether or not an AF assist light has been used during autofocusing. By reference to information indicating whether or not an AF assist light has been used, the controller 210 calculates an evaluation value concerning the save decision condition H. If a still picture has been shot by performing an autofocus (AF) operation with the AF assist light turned ON, a chapter generated before the still picture is shot includes a frame in which the subject is irradiated with the AF assist light. The AF assist light is emitted particularly when a subject image with low illuminance needs to be brought into focus during a contrast AF operation. By irradiating the subject with the AF assist light, a variation in the contrast value of the subject during the contrast AF operation can be detected more easily. In this manner, the AF assist light is emitted to detect a variation in contrast value more easily, not to light the subject up with the light beam well. That is why a chapter that has been generated while the AF assist light is emitted may include an unintentional frame for the shooter and will be a candidate chapter that is not worth saving. The evaluation value of a chapter based on the save decision condition H will be identified herein by "h". The evaluation value h calculated is normalized to be 100 if the AF assist light has been used and to be zero otherwise.

The save decision condition I indicates how much the subject fits the shooting scene mode currently selected. Based on the degree to which the subject fits the shooting scene mode, the controller 210 calculates an evaluation value concerning the save decision condition I. For example, if shooting scene mode currently selected is "baby" mode but unless the face of any of the babies on the list has been recognized, a chapter that has been generated will be a candidate chapter that is not worth saving in the digest movie file. The evaluation value of a chapter based on the save decision condition I will be identified herein by "i". The evaluation value i calculated is normalized to be zero if the degree of fitting is higher than a predetermined reference and to increase as the degree of fitting decreases.

The save decision condition J indicates the length of the chapter generated. By reference to information about the length of the chapter generated, the controller 210 calculates an evaluation value concerning the save decision condition J. If the instructions to shoot still pictures have been issued at short intervals (e.g., less than one second) so as to shoot pictures either consecutively or rapidly, then chapters to be generated will be short chapters. And if a digest movie were made up of such short chapters, then the scenes would change too frequently for the viewer to understand the contents of the video easily. That is to say, the resultant movie would be an unpleasant one for him or her. In that case, the chapters thus generated would be candidate chapters that are not worth saving. The evaluation value of a chapter based on the save decision condition J will be identified herein by "j". The evaluation value j calculated is normalized to be 100 if the length of the chapter is equal to or shorter than a predetermined time length and to be zero if the length of the chapter is longer than the predetermined time length.

The save decision condition K indicates whether high-speed autofocusing (AF) has been used or not. By reference to information indicating whether high-speed AF has been used or not, the controller 210 calculates an evaluation value concerning the save decision condition K. In performing high-speed AF, the CCD image sensor 201 is made to capture images at a low resolution and make AF detection frequently in order to shorten the release time lag before a still picture is shot. As the CCD image sensor 201 captures images at such a low resolution in performing high-speed AF, the chapters generated will be low-resolution, low-image-quality video. That is why a chapter that has been generated during the high-speed AF will be a candidate chapter that is not worth saving. The evaluation value of a chapter based on the save decision condition K will be identified herein by "k". The evaluation value k calculated is normalized to be 100 if the high-speed AF has been used and to be zero otherwise.

The save decision condition L indicates whether preliminary flashing has been used or not. By reference to information indicating whether preliminary flashing has been used or not, the controller 210 calculates an evaluation value concerning the save decision condition L. In order to reduce the red eye phenomenon and to determine an appropriate intensity of the flashlight to emit for photometric purposes, flashlight called "preliminary flashlight" is sometimes emitted. A chapter that has been generated during such a preliminary flashing period will be significantly flickering video and will be a candidate chapter that is not worth saving. The evaluation value of a chapter based on the save decision condition L will be identified herein by "l". The evaluation value l calculated is normalized to be 100 if the preliminary flashing has been used and to be zero otherwise.

The save decision condition M indicates how much the diaphragm has been operated. By reference to information indicating how much the diaphragm has been operated for autoexposure purposes, the controller 210 calculates an evaluation value concerning the save decision condition M. If the diaphragm has been operated frequently and rapidly during the autoexposure, the chapters that have been generated in the meantime are likely to be unpleasant video, of which the luminance changes significantly and which flickers frequently. In addition, depending on the diaphragm mechanism used, significant noise could be produced due to the operation to possibly make the recorded audio annoying, too. That is why if the diaphragm has been operated too frequently and too rapidly during the autoexposure, the chapters that have been generated in the meantime will be candidate chapters that are not worth saving. The evaluation value of a chapter based on the save decision condition M will be identified herein by "m". The evaluation value m calculated is normalized to be zero if the diaphragm has been operated to less than a predetermined degree and to increase as the diaphragm has been operated to an increasing degree.

The save decision condition N indicates the moving velocity of the optical zoom lens barrel. Based on the moving velocity of the optical zoom lens barrel while chapters are being generated, the controller 210 calculates an evaluation value concerning the save decision condition N. In shooting a still picture, the optical zooming level is sometimes changed quickly to given high priority to high-speed framing. However, the chapters generated during such a period are highly likely to be unpleasant video due to a steep change of the angle of view. In addition, depending on the lens barrel used, significant noise could be produced due to the operation of the zoom mechanism to possibly make the recorded audio annoying, too. That is why the chapters that have been generated while the optical zooming level is being changed quickly will be candidate chapters that are not worth saving. The evaluation value of a chapter based on the save decision condition N will be identified herein by "n". The evaluation value n calculated is normalized to be zero if the moving velocity of the zoom lens barrel is less than a predetermined reference and to increase as the moving velocity of the zoom lens barrel rises.

The save decision condition O indicates the shooting time interval. By reference to information indicating the interval between the time when the chapter recorded was shot last time and the time when the chapter recorded has been shot this time, the controller 210 calculates an evaluation value concerning the save decision condition O. By comparing the dates and times of shooting that are recorded in the management database, the controller 210 can calculate the interval between the times of shooting. If the shooting interval is shorter than a predetermined value (e.g., 10 seconds), then the resultant digest movie will be a series of similar scenes. If such redundant video including a lot of similar scenes should be avoided, then the chapters that have been generated will be candidate chapters that are not worth saving. The evaluation value of a chapter based on the save decision condition O will be identified herein by "o". The evaluation value o calculated is normalized to be 100 if the shooting time interval is less than a predetermined reference and to be zero if the shooting time interval is equal to or longer than the predetermined reference.

The save decision condition P indicates whether or not the subject includes any person not to be shot. By reference to information indicating whether or not the subject includes any person not to be shot, the controller 210 calculates an evaluation value concerning the save decision condition P. The controller 210 determines whether or not the person that has been recognized by face recognition is a person specified on the list. For example, a chapter including any particular person whose privacy should be protected will be a candidate chapter that is inappropriate for saving. The evaluation value of a chapter based on the save decision condition P will be identified herein by "p". The evaluation value p calculated is normalized to be 100 if the subject includes any person not to be shot and to be zero otherwise.

The save decision condition Q indicates the location and azimuth of shooting. By reference to shooting location and azimuth information provided by the GPS unit 270, the controller 210 calculates an evaluation value concerning the save decision condition Q. By comparing pieces of GPS information that are stored in the management database, the controller 210 can calculate the distance/interval between the locations of the camera during the previous and current shooting sessions. If the distance/interval is shorter than a predetermined value (e.g., 50 m), then the resultant digest movie would be a series of scenes that have been shot at similar locations. If such redundant video including a lot of similar scenes should be avoided, then the chapters generated will be candidate chapters that are not worth saving. The evaluation value of a chapter based on the save decision condition Q will be identified herein by "q". Even though the evaluation value is supposed to be calculated in this example by reference to only the shooting location information provided by the GPS unit 270, the evaluation value may also be calculated by using the shooting azimuth information provided by an azimuth sensor in combination with the shooting location information. The evaluation value q calculated is normalized to be 100 if the distance/interval between the locations of the camera during the previous and current shooting sessions is shorter than a predetermined reference value but to be zero if the distance/interval is equal to or longer than the predetermined reference value.

In the digital camera 100 of this embodiment, the controller 210 calculates the evaluation values a through q based on the save decision conditions A through Q in order to determine whether or not to write chapters on the memory card 221. The save decision conditions A through Q of this embodiment are based on the management information (shooting information) for still picture data that has been generated in accordance with an instruction to shoot a still picture. In the digital camera 100 of this embodiment, the evaluation values a through q based on the save decision conditions A through Q are written on the management database. Those evaluation values a through q may be added to either the header section of the still picture data generated or the meta-information of movie data.

Also, those save decision conditions A through Q are provided with their associated weighting coefficients ka through kq. In this description, the weighting coefficient is a coefficient, by which the evaluation value of each save decision condition is multiplied when the controller 210 determines whether or not to write the chapters generated on the memory card 221. A save decision condition provided with a larger weighting coefficient becomes a condition for determining more strictly whether or not to write the chapters generated on the memory card 221.

In making a save decision, the controller 210 multiplies the evaluation values a through q which are associated with the respective save decision conditions A through Q by the coefficients ka through kq, respectively, thereby obtaining degrees of non-necessity X of chapters, which are calculated by the following Equation (1):

$$X=a*ka+b*kb+\ldots+p*kp+q*kq \tag{1}$$

If the degree of non-necessity X is greater than a predetermined threshold value Y, the controller 210 decides not to write the chapters generated on the memory card 221. This is because if the degree of non-necessity X is high, then the chapters generated are highly likely to form an inappropriate movie. If the user wants to generate a digest movie consisting of only good chapters that are strictly selected from all chapters generated, then the threshold value Y may be set to be a relatively low value. On the other hand, if he or she wants a digest movie including as many viewable chapters as possible which are selected from among all chapters generated, then the threshold value Y may be set to be a relatively high value. The threshold value Y may be set to be a fixed value when the digital camera 100 is shipped or may be set arbitrarily by the user.

Alternatively, the evaluation values a through q may be defined so that the smaller any of these evaluation values a through q, the worse the result of evaluation and that the larger any of these evaluation values a through q, the better the result of evaluation, as described above. In that case, the relation between the degree of non-necessity X and the threshold value Y reverses. Then, the controller 210 may decide not to write the chapters generated on the memory card 221 unless the degree of non-necessity X exceeds the predetermined threshold value Y.

The coefficients ka through kq will be described with reference to FIG. 10. As shown in FIG. 10, the coefficients ka through kq are set on a shooting mode basis. For example, in a night view mode, the illuminance is lower at night in most cases. That is why if the same coefficient kf indicating the lowness of illuminance as the one used in a normal shooting mode is used, then the decision will be made that most chapters are unnecessary. For that reason, in the night view mode, a coefficient kf', which has a smaller value than the coefficient kf, is used. Also, in a sport shooting mode, the shooter would perform panning/tilting or optical zooming intentionally more quickly than in the normal shooting mode. That is why a coefficient kd', which has a smaller value than the coefficient kd, and a coefficient kn', which has a smaller value than the coefficient kn, are used. As a result, the controller 210 can calculate by Equation (1) an appropriate degree of non-necessity X for the shooting mode selected. Consequently, the controller 210 can make a right save decision according to the shooting mode.

In the embodiment described above, the controller 210 determines, according to the degree of non-necessity X, whether or not to write chapters generated on the memory card 221. However, this is just an example of the present disclosure. Optionally, the controller 210 may also determine, according to the degree of non-necessity X, whether or not to write not only the chapters generated but also a still picture generated on the memory card 221.

Also, depending on the option selected for any item of the digest movie menu shown in FIG. 5, the controller 210 may determine, according to the degree of non-necessity X, whether or not to write a chapter just before an instruction to record a still picture and/or a chapter right after the instruction to record a still picture on the memory card 221.

1-3. Effects

As described above, according to this embodiment, the image processor 403 includes a movie generating section 26 which generates movie data based on an image capturing signal that has been generated by the image capturing section 264 and a controller 263 which determines, in accordance with a shooting instruction and by reference to information specifying a shooting condition, whether or not to write the movie data (i.e., the chapter just before a still picture is shot and/or the chapter right after a still picture has been shot) on the memory card 221.

In such an embodiment, inappropriate chapters that are not worth saving are not added to the digest movie file. As a result, a more favorable digest movie can be generated for the user. In addition, the memory space used can be cut down when the digest movie file is being generated.

(Embodiment 2)

Hereinafter, the second embodiment of the present disclosure will be described with reference to FIG. 11.

2-1. Configuration

The digital camera of this embodiment has the same configuration as the digital camera 100 of the first embodiment or as a digital camera 400 to be described later and its description will be omitted herein. In the following description, the digital camera of this embodiment will be simply referred to herein as a "digital camera".

2-2. Digest Movie Save Decision During Recording

The digital camera of this embodiment calculates the evaluation values a through q of each frame of a chapter generated based on the save decision conditions A through Q on that frame of the chapter generated, and makes an overall evaluation using those evaluation values, thereby determining whether or not to save the chapter.

The digital camera of this embodiment obtains the degree of non-necessity X of a given chapter generated by multiplying the evaluation values a through q of each frame of that chapter by the coefficients ka through kg.

The digital camera of this embodiment weights the degree of non-necessity X of a chapter that has been calculated for each frame according to the time of that chapter. Hereinafter, it will be described with reference to FIG. 11 exactly how to weight an evaluation value according to a chapter time. FIG. 11 shows various examples of weighting an evaluation value according to a chapter time.

Figure 11:
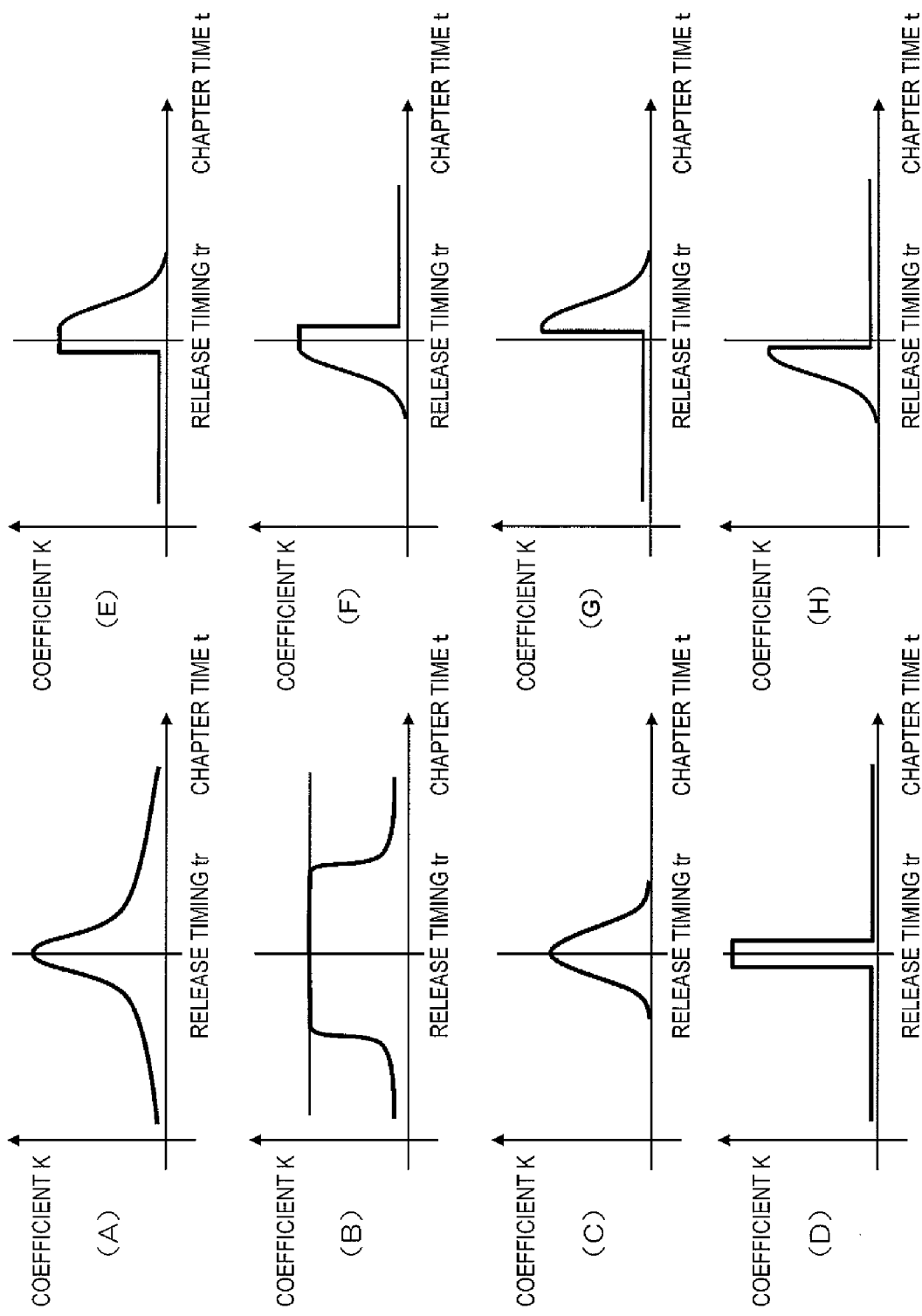
FIG. 11 shows how to add weights to save decision conditions according to the second exemplary embodiment.

In the graph shown in FIG. 11, the ordinate represents the weighting coefficient K, by which the degree of non-necessity X of each frame is multiplied, and the abscissa represents the chapter time t. The time tr indicates a point in time when an instruction to shoot a still picture is issued (which will be referred to herein as a "still picture release time tr"). As shown in FIG. 11(A), the digital camera of this embodiment calculates the degree of non-necessity X about a still picture and the degree of non-necessity X of each frame about two chapters that precede and follow the still picture, respectively, and calculates a degree of non-necessity XS based on these two values.

Specifically, in FIG. 11(A), the degree of non-necessity and weighting coefficient at a chapter time t are identified by Xt and Kt, respectively. The degree of non-necessity XS is calculated by multiplying the degree of non-necessity Xt by the weighting coefficient Kt for each of multiple chapter times t and by adding together the products obtained.

That is to say, the degree of non-necessity XS of a chapter is calculated by the following Equation (2):

$$XS=\Sigma Xt*Kt \tag{2}$$

The closer to the still picture release time tr the given frame is, the larger the number of subjects the shooter wants the frame to include. That is why if the degree of non-necessity XS is calculated by adding weights so that a chapter time close to the time tr has a larger coefficient K as shown in FIG. 11(A), the shooter's intention can be respected. If the shooter's intention is a top priority, then weights may be added so that the closer to the still picture release time tr, the larger the value of the coefficient K as shown in FIG. 11(A).

If the degree of non-necessity XS is greater than a predetermined threshold value YS, the controller 210 decides not to write the chapter generated on the memory card 221. This is because if the degree of non-necessity XS is high, then the chapters generated are highly likely to form an inappropriate movie. If the user wants to generate a digest movie consisting of only good chapters that are strictly selected from all chapters generated, then the threshold value YS may be set to be a relatively low value. On the other hand, if he or she wants a digest movie including as many viewable chapters as possible which are selected from among all chapters generated, then the threshold value YS may be set to be a relatively high value. The threshold value YS may be set to be a fixed value when the digital camera is shipped or may be set arbitrarily by the user.

Alternatively, the evaluation values a through q may be defined so that the smaller any of these evaluation values a through q, the worse the result of evaluation and that the larger any of these evaluation values a through q, the better the result of evaluation, as already described for the first embodiment. In that case, the relation between the degree of non-necessity X and the threshold value Y reverses. Then, the controller 210 may decide not to write the chapters generated on the memory card 221 unless the degree of non-necessity X exceeds the predetermined threshold value Y.

It should be noted that the save decision based on the chapter time t does not have to be made as in the example shown in FIG. 11(A) but may also be made by adding weights as shown in FIGS. 11(B) through 11(F).

For example, if the video included in the chapters is important, then the weights may be added so that the coefficient K has a high value in a broad movie range that precedes and follows the still picture release time tr as shown in FIG. 11(B).

Also, even though the save decision is supposed to be made based on the degree of non-necessity X at every chapter time falling within the movie range of the chapters in the examples shown in FIGS. 11(A) and 11(B), this is only an example of the present disclosure. Alternatively, the weighting coefficients K may be set only in a chapter time range close to the still picture release time tr and the coefficient K may be set to be zero in the other chapter time ranges as shown in FIG. 11(C).

Furthermore, although the save decision is made based on the degrees of non-necessity in the chapter time range that precedes and follows the still picture release time tr in the example described above, the save decision may also be made in two stages before the still picture release time tr and after the still picture release time tr, respectively.

Hereinafter, other exemplary methods for calculating the degree of non-necessity will be described with reference to FIGS. 11(E) through 11(H).

As shown in FIG. 11(E), the decision may be made, based on the degree of non-necessity at the still picture release time tr and the degrees of non-necessity in the chapter time range that follows the still picture release time tr, whether a chapter after the still picture release time tr is unnecessary or not. Alternatively, as shown in FIG. 11(F), the decision may also be made, based on the degree of non-necessity at the still picture release time tr and the degrees of non-necessity in the chapter time range that precedes the still picture release time tr, whether a chapter before the still picture release time tr is unnecessary or not. For example, in the first half period that precedes the still picture release time tr, an operation is performed to shoot a still picture, and therefore, the decision is likely to be made that the chapter in the first half is unnecessary. That is why by making a decision for the first and second halves separately in this manner, it is possible to avoid making a decision by mistake that even a chapter in the latter half that is worth saving is unnecessary.

Still alternatively, the decision may also be made, based on the degrees of non-necessity in the chapter time range that follows the still picture release time tr, whether a chapter after the still picture release time tr is unnecessary or not as shown in FIG. 11(G). Or as shown in FIG. 11(H), the decision may also be made, based on the degrees of non-necessity in the chapter time range that precedes the still picture release time tr, whether a chapter before the still picture release time tr is unnecessary or not.

Yet alternatively, the save decision by calculating the degree of non-necessity may also be made as shown in FIG. 11(D) under the condition at the still picture release time tr. Specifically, in that case, the digital camera may calculate the degree of non-necessity in accordance with management information associated with the still picture data that has been generated in response to an instruction to shoot a still picture and may make a save decision on the chapter that has been generated at that timing. It should be noted that this example is the same as the exemplary method of calculating the degree of non-necessity X that has already been described for the first embodiment.

If the shooter gives an instruction to shoot a still picture, he or she is highly likely to be shooting a subject that he or she wants to shoot. That is why by calculating the degree of non-necessity in accordance with the management information associated with the still picture data and making a save decision on the chapters, a digest movie can be generated with the shooter's intention respected fully.

As described above, according to this embodiment, by using either one of the degree of non-necessity at the still picture release time tr, the degrees of non-necessity in a chapter time range that follows the still picture release time tr and the degrees of non-necessity in a chapter time range that precedes the still picture release time tr or two or more of them in various combinations, the decision can be made whether or not to save a movie file (or chapter).

2-3. Effects

As described above, according to this embodiment, the controller 263 calculates evaluation values with weights added according to the shooting time and by reference to information representing shooting conditions, and determines, based on those evaluation values, whether or not to write movie data (i.e., the chapter just before a still picture is shot and/or the chapter right after the still picture has been shot) on the memory card 221.

Also, the controller 263 adds weights to increase the weight at the still picture release time tr.

Furthermore, the controller 263 adds weights so that the weight becomes zero in at least one of the period that precedes the still picture release time tr and the period that follows the still picture release time tr.

As a result, an image processor 403 which can generate a more favorable digest movie for the shooter is provided. In particular, the shooter's intention can be respected more fully by paying much attention to the release timing.

(Embodiment 3)

Hereinafter, the third embodiment of the present disclosure will be described with reference to FIGS. 12 through 14.

3-1. Configuration

Figure 12:
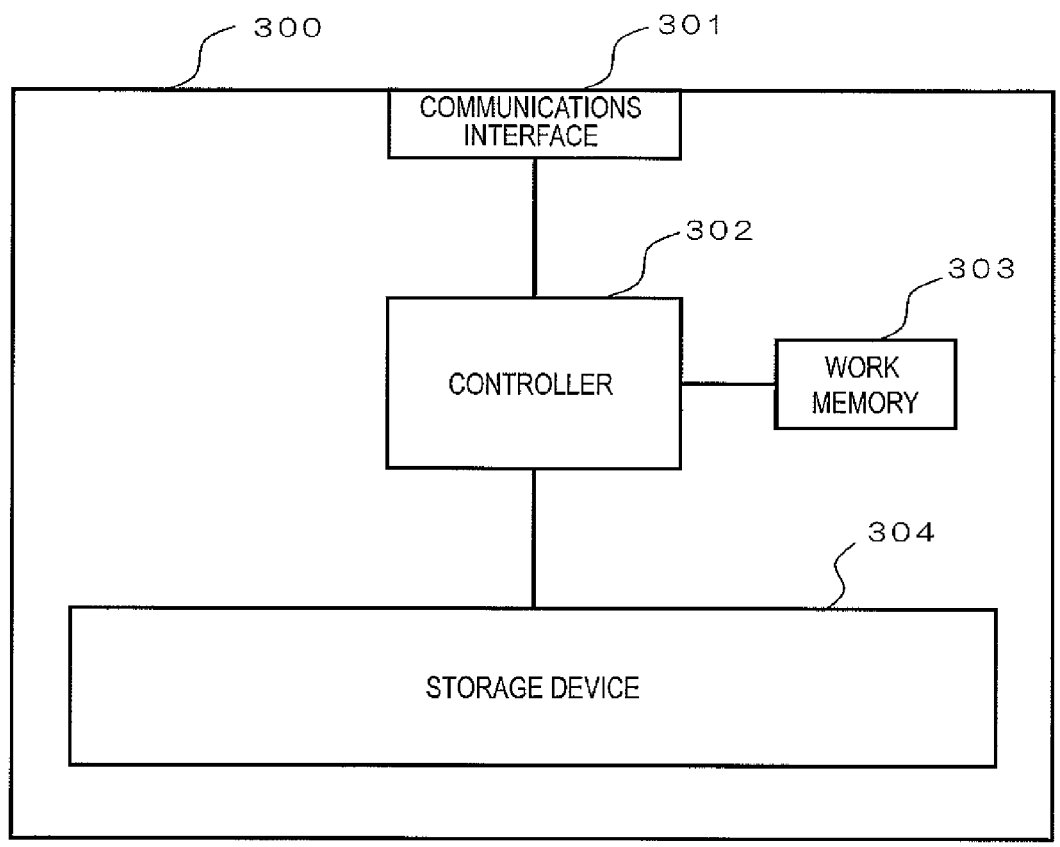
FIG. 12 is a block diagram showing a server as the third exemplary embodiment.
Figure 13:
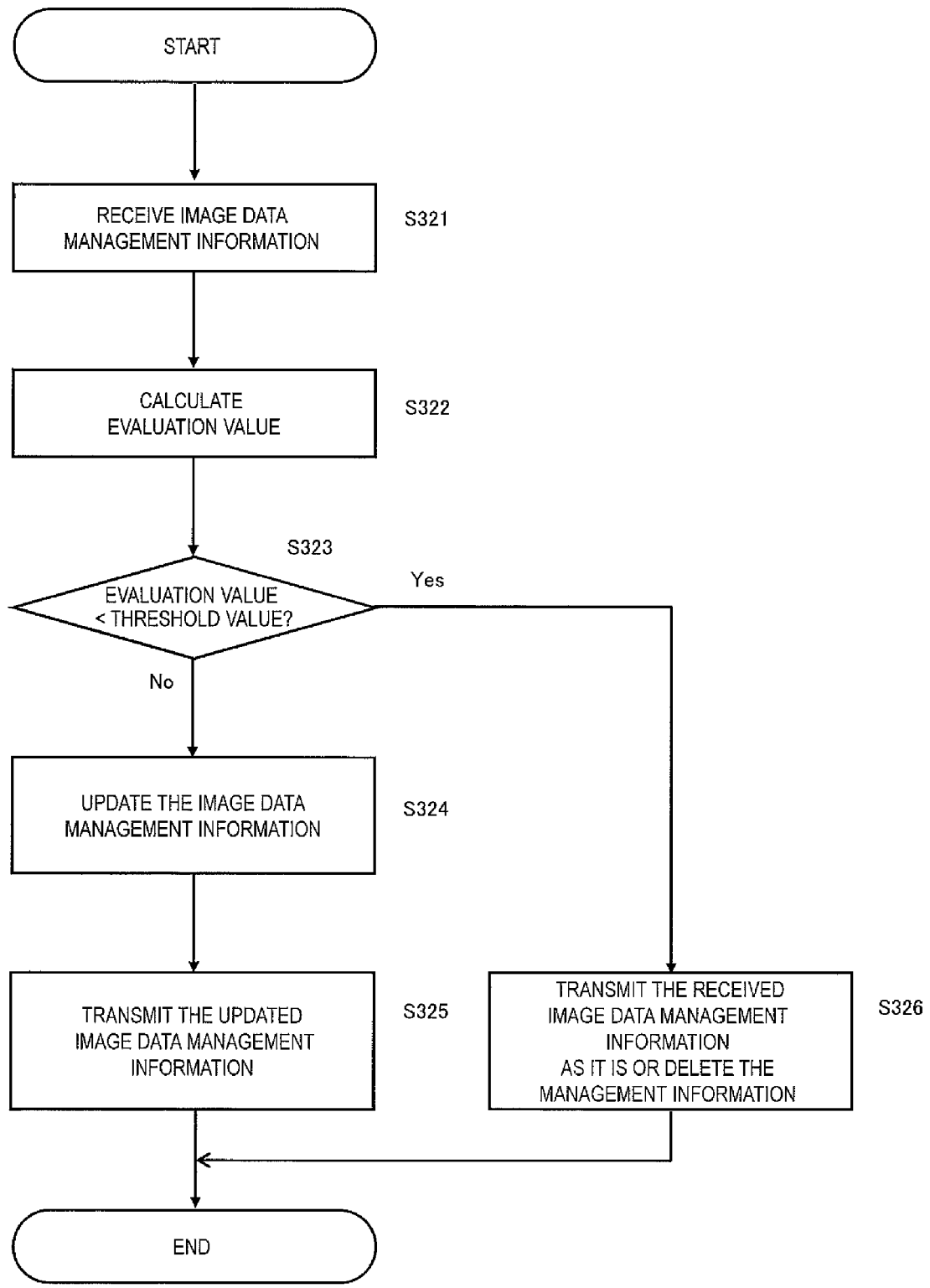
FIG. 13 is a flowchart showing the procedure of updating image data management information according to the third exemplary embodiment.

FIG. 12 is a block diagram illustrating a server 300 according to this third embodiment. The server 300 includes a communications interface 301, a controller 302, a work memory 303 and a storage device 304.

The server 300 is connected to various electronic devices with communication capability over a network. Examples of such electronic devices with communication capability include personal computers (PCs), digital cameras, and smart phones.

The communications interface 301 exchanges various kinds of data with those electronic devices with communication capability over the network.

The controller 302 controls the overall operation of the server 300. Also, the controller 302 processes the various kinds of data that have been obtained by the communications interface 301. The controller 302 can write the various kinds of data processed on the storage device 304. The controller 302 can also read those various kinds of data that have been written on the storage device 304.

The controller 302 may be comprised of a ROM which stores program information and a CPU which processes the program information. The ROM stores a program for use to control the overall operation of the server 300.

The controller 302 may be implemented as either only a set of hardware circuits or a combination of hardware and software. The controller 302 may be implemented as a microcomputer, for example. Also, the ROM does not have to be one of the internal components of the controller 302 but may also be provided outside of the controller 302 as well.

The work memory 303 functions as a work memory for the controller 302 and may be implemented as a DRAM (dynamic random access memory), for example.

The storage device 304 can store a huge size of data. The various kinds of data that have been written and stored on the storage device 304 may be read as needed by the controller 302 as described above. The storage device 304 may be an HDD (hard disk drive), for example.

3-2. Operation

Hereinafter, it will be described with reference to FIG. 13 how the server 300 of this embodiment operates.

First of all, the communications interface 301 receives image data management information from a digital camera with communications capability over a network (in Step S321).

The image data management information will be described briefly with reference to FIG. 14. The image data management information is management information for still picture files and movie files (chapters). As shown in FIG. 14, the image data management information includes content types, real file names, chapter information, relation information and shooting information. The shooting information includes various kinds of information about the shooting condition during a shooting session (including the date and time of shooting, scene mode information, geographic location information, shooting direction, cap closure information, camera shake information, and so forth). As can be seen, the image data management information includes the various kinds of information that is included in the management database according to the first embodiment.

Next, the controller 302 calculates evaluation values based on the shooting information included in the image data management information that has been obtained by the communications interface 301. As in the first embodiment described above, save decision conditions A through Q are also defined according to this embodiment. Just like the controller 210 of the first embodiment described above, the controller 302 also calculates evaluation values a through q based on the save decision conditions A through Q (in Step S322). The controller 302 also calculates the degree of non-necessity X by Equation (1) described above.

Subsequently, the controller 302 compares the degree of non-necessity X calculated to a predetermined threshold value Z, thereby determining whether or not the movie file (chapters) is inappropriate for playback (in Step S323). The predetermined threshold value Z is stored in advance in an internal memory in the controller 302.

If the degree of non-necessity X is equal to or greater than the predetermined threshold value Z (i.e., if the answer to the query of the processing step S323 is NO), the controller 210 updates the image data management information. Specifically, the controller 210 deletes information about the movie files (chapters) that the controller 210 has found inappropriate for playback from the image data management information. In the example illustrated in FIG. 14, the lens cap closure information about a still picture file with the content ID "D1-P1" says "closed", which means that the chapters that precede and follow the still picture are highly likely to be quite dark. Next, the controller 302 decides that the movie files (chapters) that precede and follow the still picture are inappropriate for playback and deletes information about those two movie files (chapters) from the image data management information.

The controller 302 calculates evaluation values as to information about every movie file (chapter) included in the image data management information, thereby determining whether or not that movie file (chapter) is inappropriate for playback. Then, the controller 320 deletes information about such a movie file (chapter) that has turned out to be inappropriate for playback from the image data management information. This series of processing steps form the step of updating the image data management information (Step S324).

Next, the controller 302 instructs the communications interface 301 to transmit the image data management information that has been updated over the network (in Step S325). The image data management information updated that has been transmitted from the communications: interface 301 may be received by any electronic device that is connected to the network. For example, such an electronic device may be a digital camera that has transmitted the image data management information to the server 300 over the network or any other digital camera connected to the same network.

On the other hand, if the degree of non-necessity X of every movie file (chapter) included in the image data management information is smaller than the predetermined threshold value Z (i.e., if the answer to the query of the processing step S323 is YES), then the controller 302 does not update the image data management information but instructs the communications interface 302 to transmit the image data management information that has been received by the server 300 as it is over the network. Or the controller 302 deletes the image data management information that has been received by the server 300 (in Step S326).

In the foregoing description of the exemplary operation, a digital camera with communication capability is supposed to upload the image data management information to the server 300. However, this is only an example of the present disclosure. Alternatively, the image data management information may also be uploaded from a PC or smart phone with communication capability to the server 300.

Also, in the example described above, the server 300 of this embodiment is supposed to receive the image data management information from a digital camera with communication capability. However, this is just an example of the present disclosure, too. Optionally, the server 300 of this embodiment may also be configured to receive the image data management information and a plurality of movie files (chapters) from a digital camera with communication capability. The image data management information includes information about respective movie files (chapters) and information about various shooting conditions (shooting information). And those two kinds of information are correlated with each other.

Optionally, the controller 302 may calculate shooting-information-based evaluation values by reference to the image data management information and may determine, based on those evaluation values calculated, whether or not to write the respective movie files (chapters) on the storage device 304.

As a result, a digest movie file that includes no inappropriate chapters for playback at all is written on the storage device 304. If a person other than the person who has uploaded the image data management information and the movie files (chapters) to the server 300 accesses the server 300, such a digest movie file including no inappropriate chapters for playback at all will be shared at the server 300. In sharing the digest movie file, the right to access the server 300 may be controlled by a known technique.

In this embodiment, the controller 302 may also calculate the degree of non-necessity of each frame of the chapters that precede and follow a still picture and may determine, based on those degrees of non-necessity, whether or not to update the image data management information as described for the second embodiment. Alternatively, the controller 302 may determine whether or not to write the movie files (chapters) on the storage device 304.

3-3. Effects

As described above, a server 300 according to this embodiment includes a communications interface 301 which makes communications over a network, and a controller 302 which processes data that has been obtained by the communications interface 301 and which makes the communications interface 301 transmit the processed data. The communications interface 301 receives, over the network, image data management information which associates image data that has been generated by shooting with a shooting condition to be satisfied during shooting. The controller 302 determines, by reference to information concerning the shooting condition, whether or not to update the image data management information, and makes the communications interface 301 transmit the updated image data management information if the controller has decided to update the image data management information.

In such an embodiment, if a digest movie file that has been obtained with a digital camera, for example, is played back in accordance with the image data management information that has been updated by the server 300, inappropriate chapters not to be played back, which are included in the digest movie file, can be skipped and only appropriate chapters can be played back.

The server 302 further includes a storage device 304. The communications interface 301 further receives a movie file (chapter). And the controller 302 determines, by reference to the information concerning the shooting condition, whether or not to write the movie file (chapter) on the storage device 304.

In such an embodiment, a digest movie file, including no inappropriate chapters that should not be played back, can be written on the storage device 304. If a person other than the person who has uploaded the image data management information and the movie file (chapter) to the server 300 accesses the server 300, such a digest movie file, including no inappropriate chapters that should not be played back, can be shared at the server 300.

(Other Embodiments)

Although Embodiment 1 to 3 have been described herein as just examples of the technique of the present disclosure, various modifications, replacements, additions or omissions can be readily made on those embodiments as needed and the present disclosure is intended to cover all of those variations. Also, a new embodiment can also be created by combining respective elements that have been described for Embodiment 1 to 3 disclosed herein.

Thus, other embodiments of the present disclosure will be described as an example.

In the foregoing description of embodiments, the degree of non-necessity X of a chapter is supposed to be calculated by Equation (1) in which the evaluation values a through q associated with the respective save decision conditions A through Q are multiplied by the coefficients ka through kg and used to perform save decision processing on the chapter generated. However, this is just an example of the present disclosure. As long as a condition that needs to be given high priority in making the save decision is set in advance and as long as the chapter generated can be determined to be unnecessary using evaluation values satisfying that condition, there is no need to calculate the degree of non-necessity using evaluation values satisfying other conditions. For example, if the cap closure condition A indicates that the cap is closed, then the image shot should be solid black and there is no need to save such an image shot. That is why it can be said that there is no need to evaluate the conditions other than the condition A in such a situation. Also, if the cap closure condition A indicates that the cap is closed, the controller 210 may decide not to write the chapter generated on the memory card 221. Furthermore, if the condition P indicating whether or not the subject includes any person not to be shot says that the subject does includes a person not to be shot, there is no need to save the image shot to protect the right to privacy. That is to say, it can be said that there is no need to evaluate the conditions other than the condition P, either, in such a situation. If the information concerning the condition P indicates that the subject does include a person not to be shot, the controller 210 may decide not to write the chapter generated on the memory card 221.

The technique of the present disclosure is also applicable to software (computer program) that defines how to calculate the evaluation values and how to make the save decision described above. The operation defined by such a program is as shown in FIGS. 9 and 13, for example. Such a program may be distributed by being stored in a removable storage medium and may also be downloaded over telecommunications lines. By making a processor built in a computer execute such a program, the various operations of the embodiments described above can be carried out.

Figure 15:
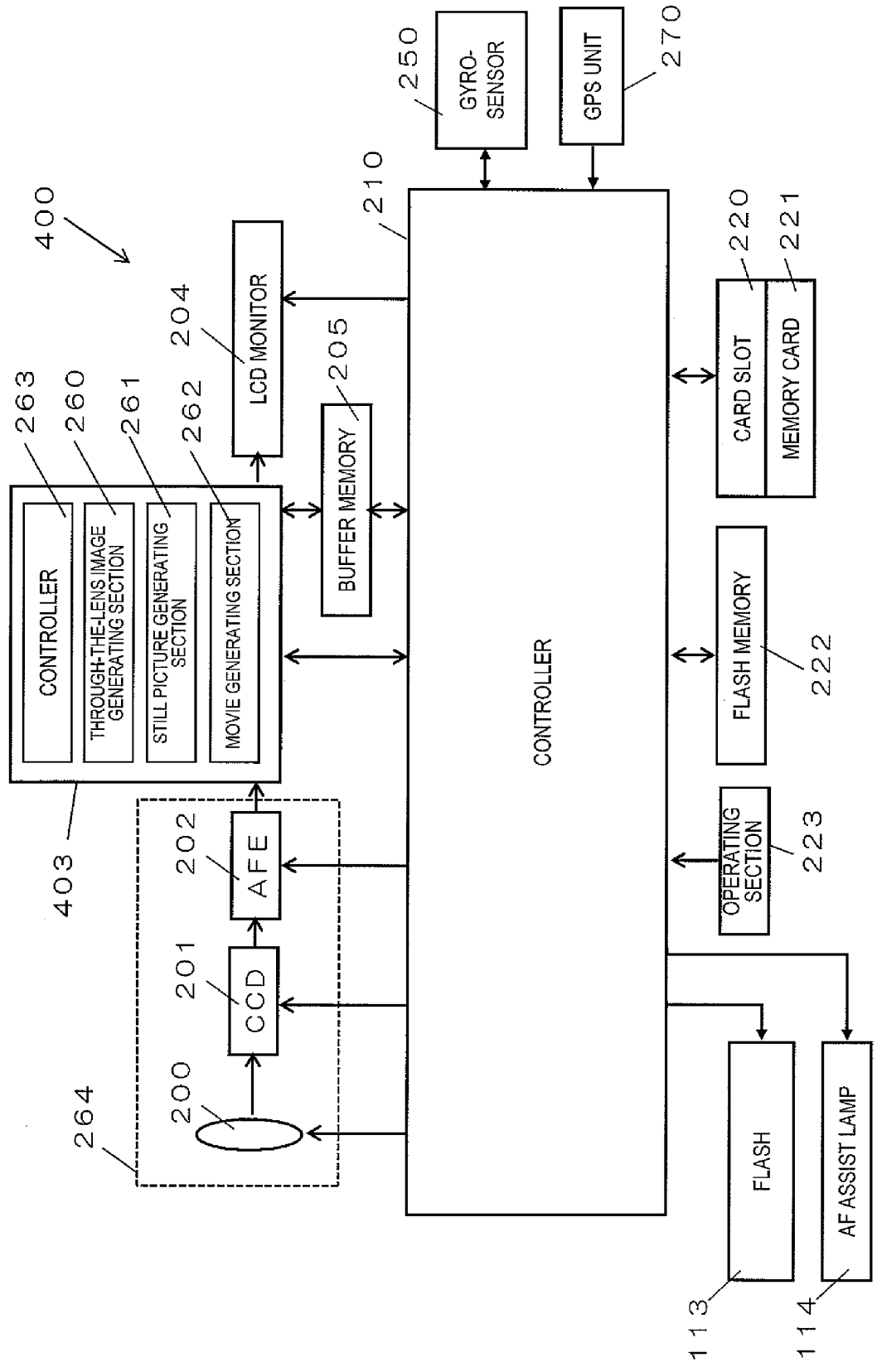
FIG. 15 illustrates a system configuration for a digital camera 400 as a modified example the first exemplary embodiment.

The electrical configuration of a digital camera 400 as a modified example of the first embodiment will be described with reference to FIG. 15. The image processor 403 of this digital camera 400 includes a through-the-lens image generating section 260, a still picture generating section 261, a movie generating section 262, and a controller 263. The other components of this digital camera 400, except the image processor 403, are the same as the counterparts of the digital camera 100 of the first embodiment.

The controller 263 of this image processor 403 has some of the functions that the controller 210 of the digital camera 100 of the first embodiment has. The controller 263 calculates the degree of non-necessity based the shooting conditions and determines, according to the degree of non-necessity calculated, whether or not to write the chapter generated on the memory card 221. Even in such a configuration, the controller 263 can make an appropriate save decision according to the shooting mode selected.

The overall operation of this digital camera 400 is the same as that of the digital camera 100 of the first embodiment, and its description will be omitted herein.

Various embodiments have been described as examples of the technique of the present disclosure by providing the accompanying drawings and a detailed description for that purpose.

That is why the elements illustrated on those drawings and/or mentioned in the foregoing description include not only essential elements that need to be used to overcome the problems described above but also other inessential elements that do not have to be used to overcome those problems but are just mentioned or illustrated to give an example of the technique of the present disclosure. Therefore, please do not make a superficial decision that those inessential additional elements are indispensable ones simply because they are illustrated or mentioned on the drawings or the description.

Also, the embodiments disclosed herein are just an example of the technique of the present disclosure, and therefore, can be subjected to various modifications, replacements, additions or omissions as long as those variations fall within the scope of the present disclosure as defined by the appended claims and can be called equivalents.

The present disclosure is implemented as not only the digital camera 100 but also any other kind of image capture device such as a movie camera or a cellphone with camera.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2012-073189 filed Mar. 28, 2012 and No. 2013-029137 filed Feb. 18, 2013, the entire contents of which are hereby incorporated by reference.

What is claimed is:

1. An image processing apparatus comprising:
an image processor configured to generate movie data based on an image capturing signal that has been generated by an image capturing section; and
a controller configured to determine, by reference to information concerning a shooting condition, whether or not to write the generated movie data on a storage medium in accordance with a shooting instruction,
wherein the generated movie data includes at least one of first movie data and second movie data;
when the generated movie data includes the first movie data, the image processor generates the first movie data before the shooting instruction is issued;
when the generated movie data includes the second movie data, the image processor generates the second movie data after the shooting instruction has been issued;
the information concerning the shooting condition concerns a shooting condition to be satisfied during shooting with respect to the first movie data and/or a shooting condition to be satisfied during shooting with respect to the second movie data; and
the controller calculates an evaluation value based on the information concerning the shooting condition by performing a weighting process according to a shooting time, and determines, based on the evaluation value, whether or not to write at least one of the first and second movie data on the storage medium.

2. The image processing apparatus of claim 1, wherein the shooting instruction is given by a user, and
wherein the image processor further generates still picture data in accordance with the shooting instruction, and
wherein the information concerning the shooting condition concerns at least one of a shooting condition to be satisfied during shooting with respect to the first movie data, a shooting condition to be satisfied during shooting with respect to the second movie data, and a shooting condition to be satisfied during shooting with respect to the still picture data.

3. The image processing apparatus of claim 1, wherein the controller performs the weighting process to add an increased weight to a point in time when the shooting instruction is issued.

4. The image processing apparatus of claim 3, wherein the controller performs the weighting process to add a zero weight to at least one of two periods that respectively precede and follow the point in time when the shooting instruction is issued.

5. An image capture device comprising:
an image capturing section configured to generate an image capturing signal; and
the image processing apparatus of claim 1.

6. A computer program stored on a non-transitory computer-readable storage medium, and to be used by an image processing apparatus, the program being executed to make a computer built in the image processing apparatus perform the steps of:
generating movie data based on an image capturing signal that has been generated by an image capturing section, the generated movie data including at least one of first movie data and second movie data, the first movie data being generated before a shooting instruction is issued and the second movie data being generated after the shooting instruction has been issued;
calculating an evaluation value based on information concerning the shooting condition by performing a weighting process according to a shooting time, and
determining, based on the evaluation value, whether or not to write at least one of the first and second movie data on the storage medium, wherein the information concerning the shooting condition concerns a shooting condition to be satisfied during shooting with respect to the first movie data and/or a shooting condition to be satisfied during shooting with respect to the second movie data.

* * * * *